May 26, 1953 — P. SPURLINO ET AL — 2,639,857
ACCOUNTING MACHINE
Filed Jan. 21, 1950 — 6 Sheets-Sheet 3

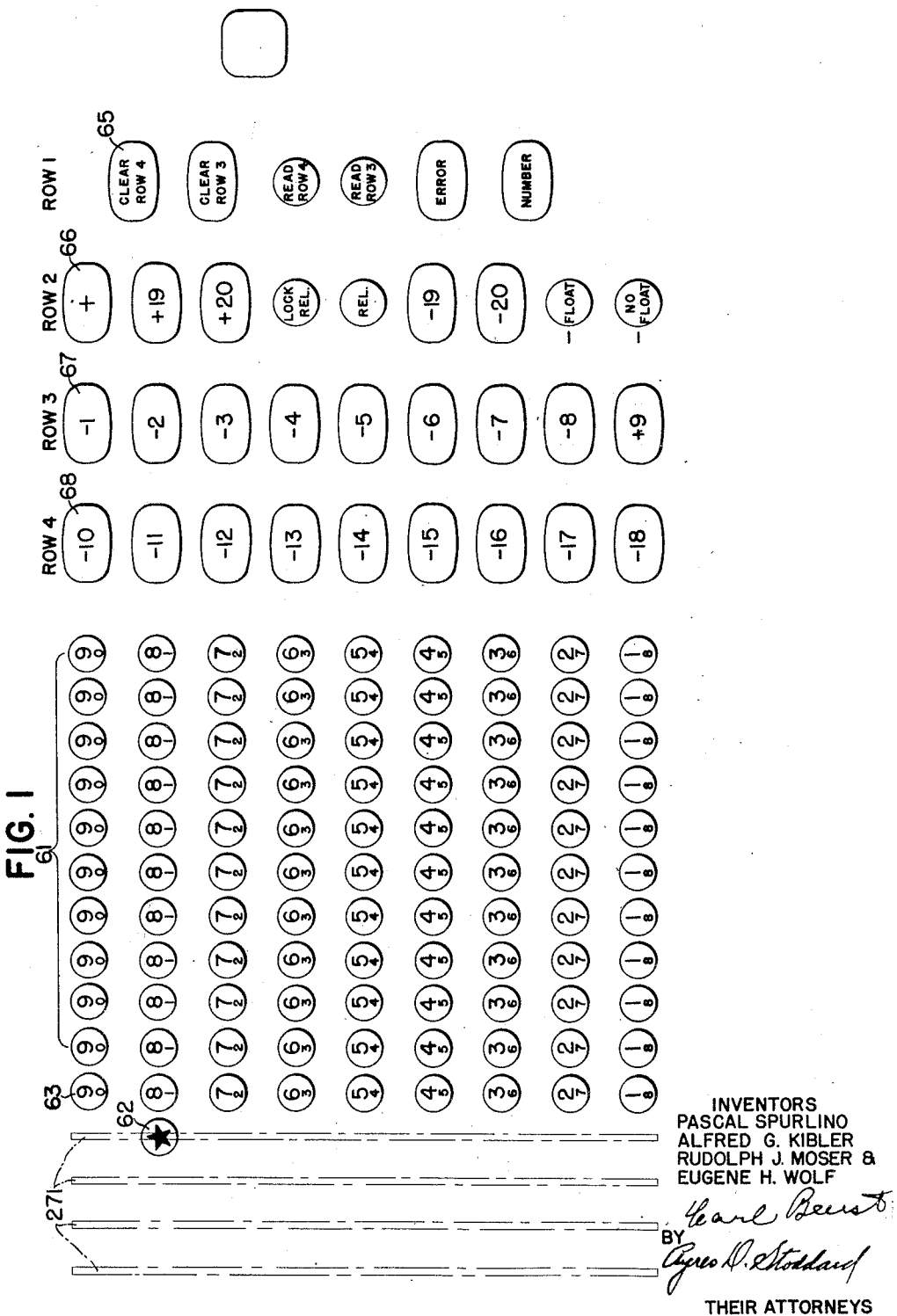

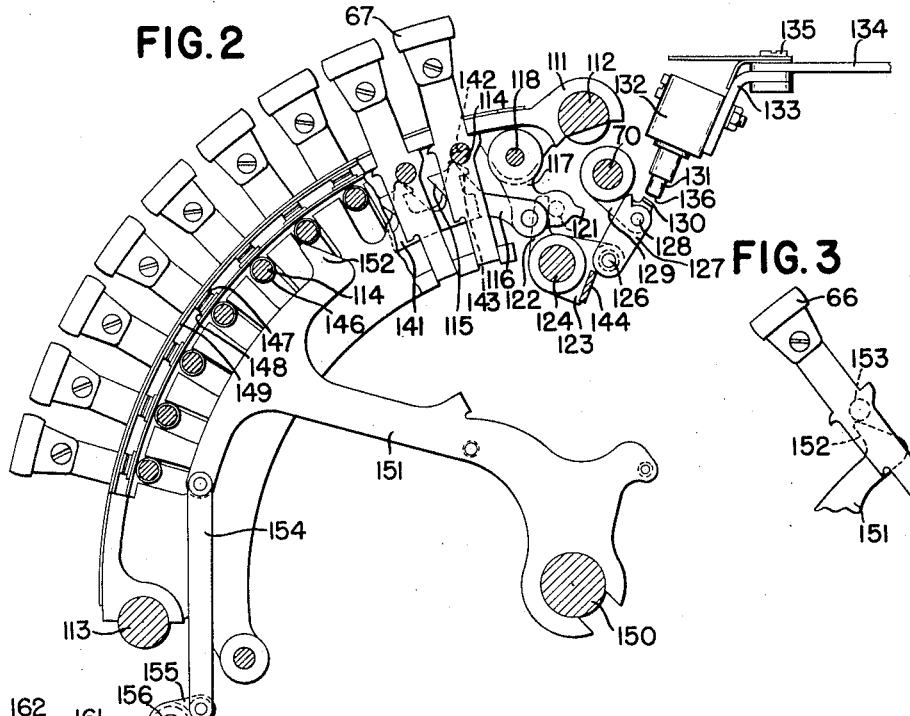
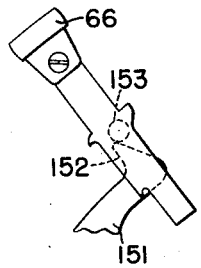
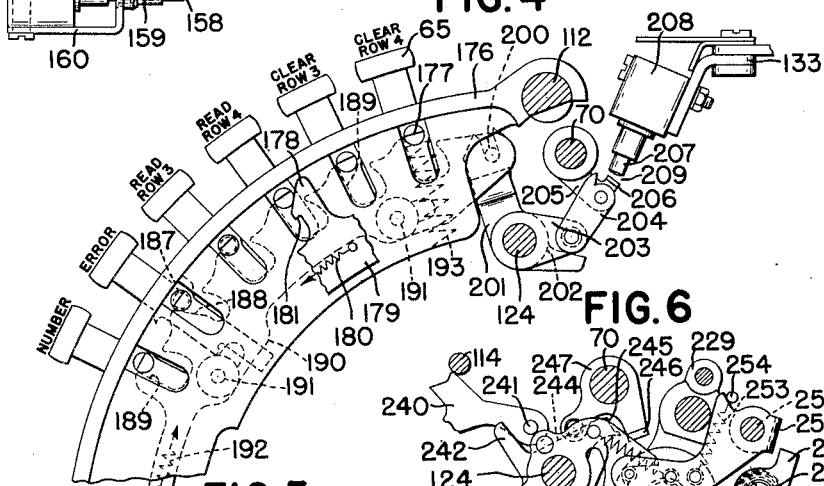
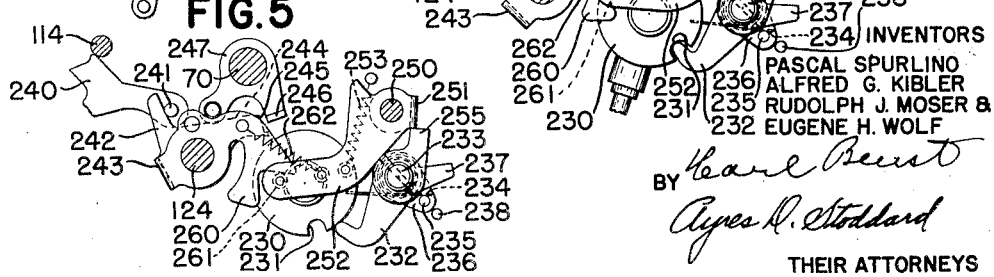

INVENTORS
PASCAL SPURLINO
ALFRED G. KIBLER
RUDOLPH J. MOSER
& EUGENE H. WOLF

BY

THEIR ATTORNEYS

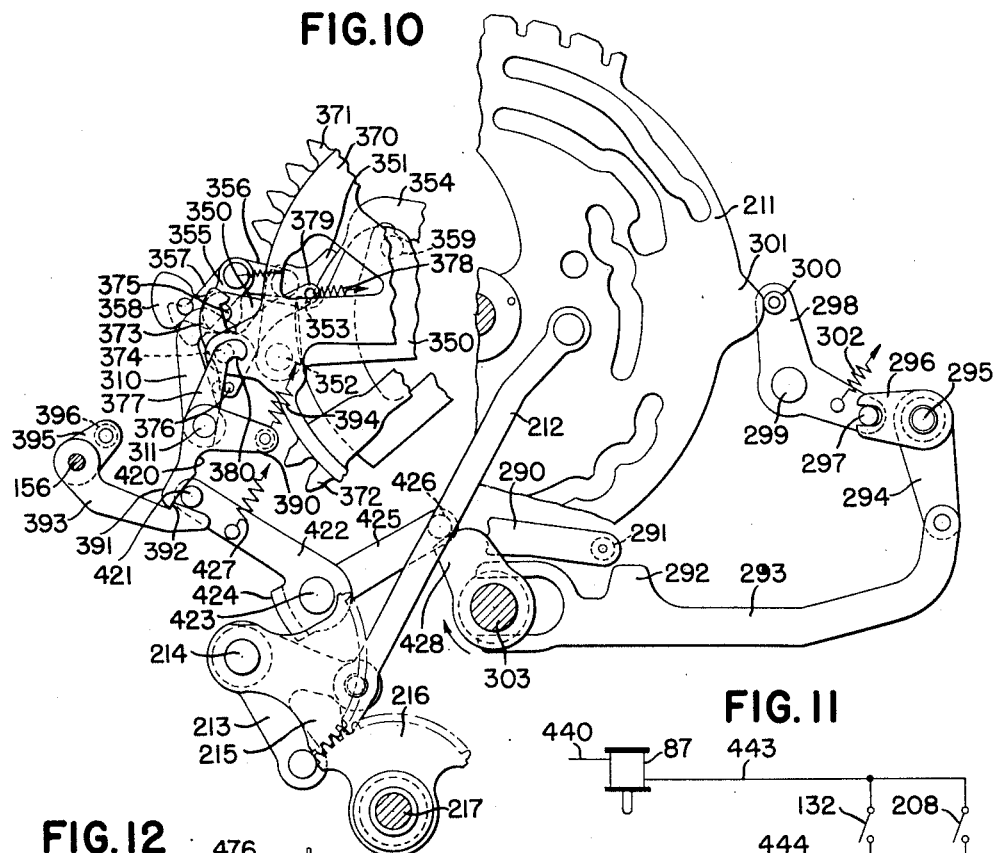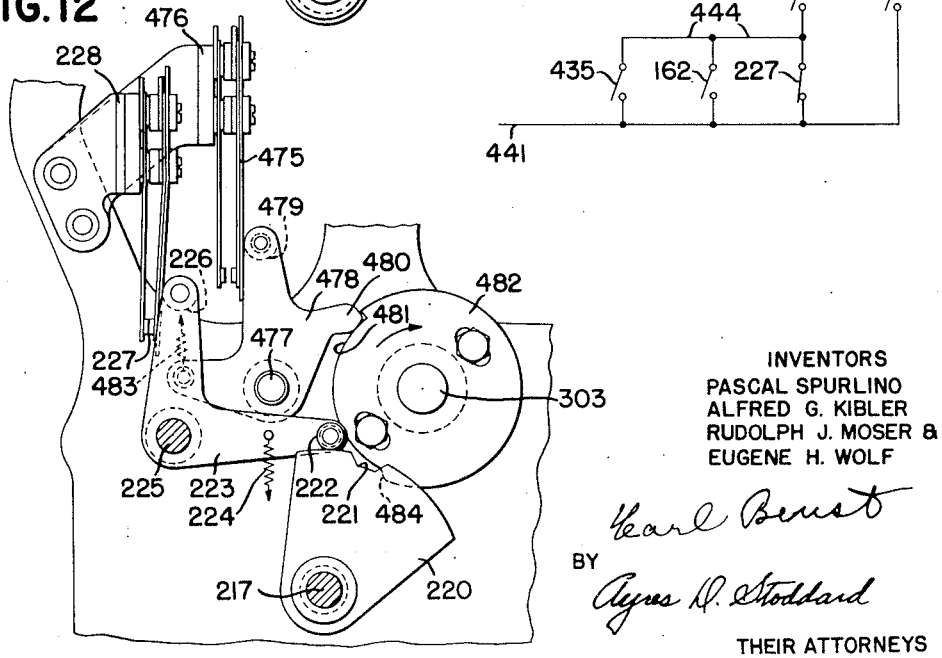

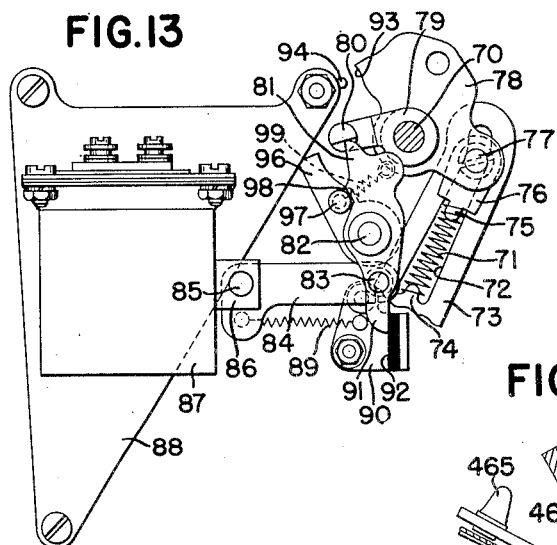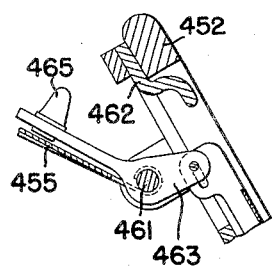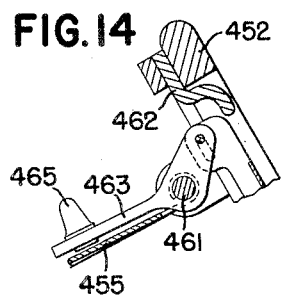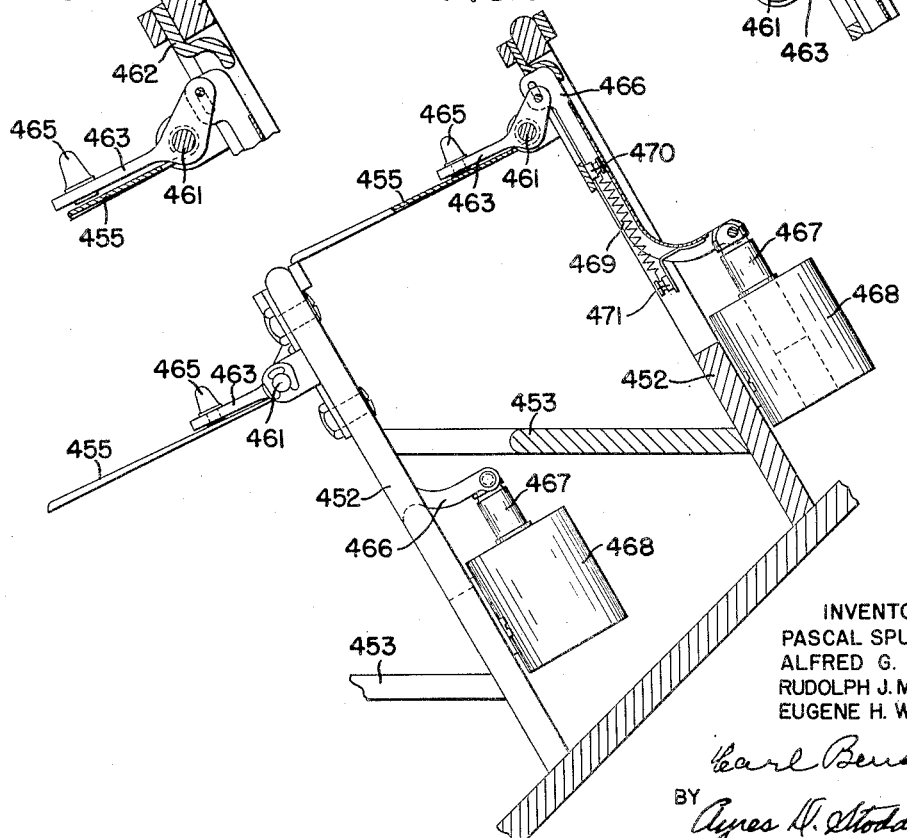

May 26, 1953 P. SPURLINO ET AL 2,639,857
ACCOUNTING MACHINE
Filed Jan. 21, 1950 6 Sheets-Sheet 6
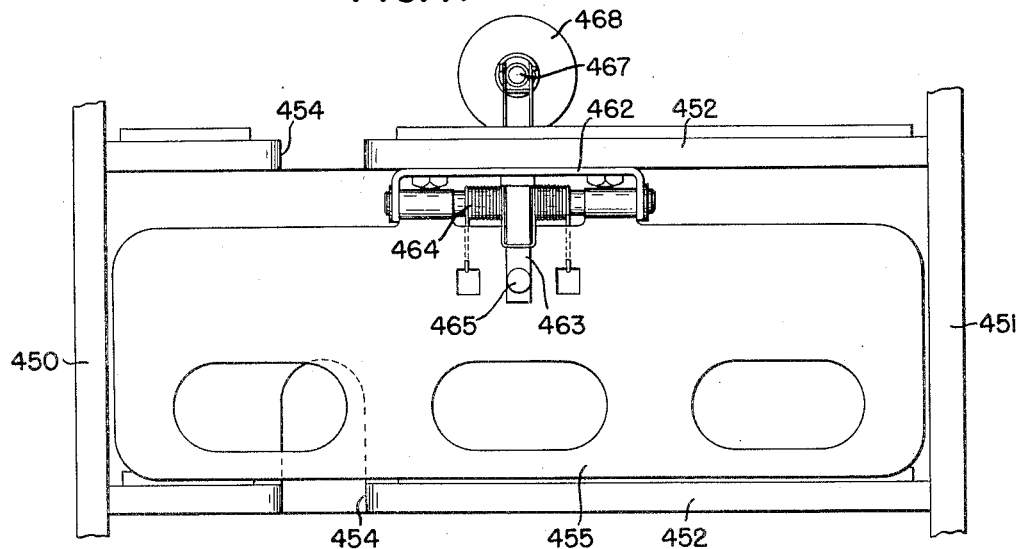
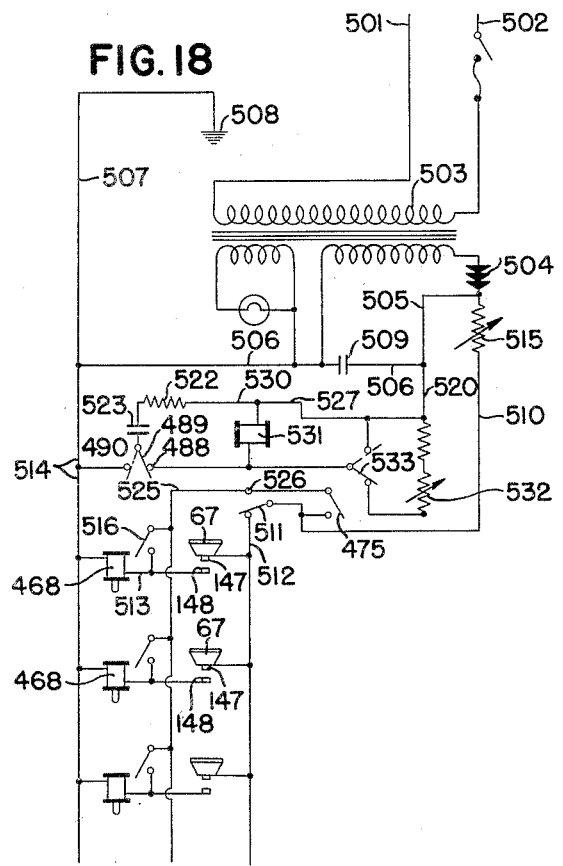
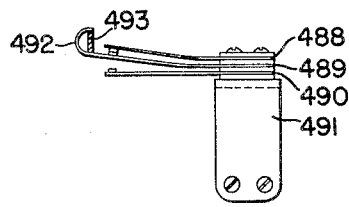
INVENTORS
PASCAL SPURLINO
ALFRED G. KIBLER
RUDOLPH J. MOSER &
EUGENE H. WOLF
BY Earl Beust
Ayres Q. Stoddard
THEIR ATTORNEYS Patented May 26, 1953

2,639,857

UNITED STATES PATENT OFFICE 2,639,857

ACCOUNTING MACHINE

Pascal Spurlino, Alfred G. Kibler, Rudolph J. Moser, and Eugene H. Wolf, Dayton, Ohio, assignors to The National Cash Register Company, Dayton, Ohio, a corporation of Maryland Application January 21, 1950, Serial No. 139,848

17 Claims. (Cl. 235—2)

This invention relates to accounting machines and similar business machines, and is directed particularly to a machine having associated therewith record material sorting compartments which may be electrically operated and controlled from an accounting machine, whereby a signal is given to the operator to indicate into which compartment the operator should place the record material relating to the particular transaction being recorded by the accounting machine.

More particularly the present invention relates to a particular novel mechanism or means for causing the indicating means to remain in an indicating position after the completion of the operation of the machine. Moreover the indicator in the present invention is caused to be moved into its indicating position upon the depression of the key associated with that particular indicator. Previously this indicating means was operated only after the differential mechanism of the machine had been positioned.

The main reason for retaining the indicating means in an operated position is to give the operator more time in which to deposit the check in the sorting bin or box associated with the particular indicator which has been operated to indicate that that is the particular compartment into which the check should be deposited, this of course being when checks are being run through the machine and sorted in connection with bank proof operations.

This feature of retaining the indicating mechanism in its operated position is also of value when an error has been made and that error is immediately discovered by the operator.

However, there is other mechanism in connection with this present invention for correcting errors when one has been made. Usually these errors are found when the operator takes the balance and if the crossfooter or balance totalizer does not balance out to zero the machine is locked against release, and therefore the operator must determine where the error has been made. To do this the operator reads the crossfooter by depressing the Error Key to determine the amount of the error, and then examines what is know as the master audit sheet to determine where the error has been made, and thereby determines into which of the sorting bins or compartments this check has been placed. When this has been determined the operator depresses the key corresponding to the bin which has the error check therein, and then sets the complement of the amount of the error upon the keyboard of the machine and then depresses a star key. The particular function of the star key will be later described in connection with the detailed description of the mechanism.

The invention is shown embodied in an accounting machine of the type described in the following United States Letters Patents, and reference may be had to them for a complete showing and complete description of standard mechanisms fully disclosed therein, either in the drawings or in the specifications. These patents are: United States Patents Nos. 1,619,796; 1,747,397; and 1,761,542, issued March 1, 1927, February 18, 1930, and June 3, 1930, respectively, to Bernis M. Shipley; No. 2,175,346, issued October 10, 1949, to Maximilian M. Goldberg; No. 2,141,332, issued December 27, 1938, to Charles H. Arnold; No. 1,693,279, issued November 27, 1928, to Walter J. Kreider; No. 2,361,662, issued October 31, 1934, to Pascal Spurlino and Konrad Rauch; No. 2,416,598, issued February 25, 1947, to Pascal Spurlino and Konrad Rauch; and 2,417,563, issued March 18, 1947, to Rudolph Moser.

The machine embodying the present invention, as now constructed, is well adapted for use by banks, and especially in the proof departments thereof, where the various items are listed and distributed, and deposits checked for proof balance at the end of the day.

Each bank in its proof department keeps an accurate record of each transaction handled by the bank, which transactions generally come from incoming mail, from out-of-town or transit banks, incoming clearings from local banks, and receiving and paying items handled by the tellers of the banks. Many banks require their lists of checks or items paid by another bank to be accompanied by a printed list of checks paid by a bank when these checks are sent back to the bank on which they are drawn.

There is in connection with the present invention a check counting mechanism which counts each check and prints the consecutive number check opposite the amount of the recording of each as said checks are recorded in the machine.

In the highest order amount bank the differential mechanism is what is known as a combination differential and is used, not for accumulating in the highest order totalizer wheel, but for printing any desired data which the bank may wish to print in connection with that particular column; however, there is a totalizer wheel associated with this bank, and during the taking of totals the differential mechanism is utilized for taking the total from the crossfooter which might have an amount in this overflow wheel of the crossfooter totalizer.

There is a mechanism in the machine under the control of a "star" key, whereby said combination differential bank may be changed from what is known as a "print" bank to a "total control bank"; that is, it may be utilized to take the amount from the highest overflow wheel so as to print such amount, which is a part of the total amount, when the balance totalizer is cleared. This bank is also utilized when an error has been made by the operator of the machine in setting up any of the amounts of any of the checks as she runs them through the machine to show the amount on the highest order wheel of the crossfooter, since an error is usually discovered when she clears the crossfooter. If an error has been made and the crossfooter does not show zero, the machine will not be released for an operation, and then it is necessary for the operator to take a reading operation of the amount which is on the crossfooter and from this reading or subtotal operation, the amount of the error may be determined and the operator then searches for this error on the master audit strip as above mentioned.

In order to properly sort the checks as they are recorded in the machine, the machine herein is provided with a plurality of compartments to receive the manually sorted record materials or checks, and is adapted for use in connection with, as above mentioned, a central control accounting machine of the type commonly used in bank clearing houses, and particularly such as that shown in the above mentioned patent to Spurlino and Rauch, No. 2,361,662.

A separate compartment is used for each bank associated with the clearing house, and all checks drawn or deposit slips credited to each of said banks are manually placed in the appropriate compartments after the amounts and other data appearing thereon have been recorded by the accounting machine.

In order to reduce the possibility of the operators filing such record material in the wrong compartment, the present invention also provides an individual indicator for each compartment, which indicators are normally in the non-indicating position, but which may be selectively moved from a non-indicating position into an indicating position to direct attention to their respective compartments, so that the operator will place the record material in only the selected one of the compartments. Classification keys on the accounting machine, which identify the different banks, are employed to selectively control electrical means for operating the indicators in such a manner that only the compartment corresponding to the particular bank involved in the last registration on the accounting machine is called to the attention of the operator, so that the record material relating to that particular registration will be filed in the proper compartment.

As above mentioned, these indicators in previous machines were not operated until after the machine had started through its operation, or in other words, until after the differential mechanism had been set. However, in the present invention, these indicators are operated immediately upon depression of the key by the operator so that the operator may have more time to deposit the check in the proper compartment. Moreover this indicator is not closed at the completion of the operation of the machine, as was previously the case, but is held in an open position for a definite length of time after the machine has completed its operation; therefore giving the operator more time to deposit the check after having taken the records therefrom and entered them into the machine.

It is, therefore, an object of the present invention to provide a sorting device of the character described, having signalling means in the form of indicators, which are selectively operable by remote control from an accounting machine or the like, and which are maintained in an indicating position subsequently to the completion of the operation of the machine.

Another object of the present invention is to cause the indicators to function immediately upon depression of the compartment selecting key by the operator.

Another object of the present invention is to provide the machine with control means whereby one of the differential mechanisms may be changed from a printing control differential to a total control differential upon the depression of a certain special key in the machine.

Another object of the present invention is to provide a special differential mechanism in the machine which under certain conditions controls the printing of data set up under control of depressed keys and in other conditions is adapted to control the printing of data, which is controlled from the totalizer.

With these and incidental objects in view the invention includes certain novel features of construction and combinations of parts, the essential elements of which are set forth in appended claims, and a preferred form or embodiment of which is hereinafter described with reference to the drawings which accompany and form a part of this specification.

In said drawings:

Fig. 1 is a diagrammatic view showing a portion of the keyboard of the machine with which the present invention is adapted to be used.

Fig. 2 is a side elevation of one of the transaction banks, particularly what is known as row 3, and shows the mechanism in connection with this bank which determines or controls or assists in the control of the release of the machine.

Fig. 3 is a detail view of the "Lock Release" key and its connection to the means which assists in releasing the machine when necessary after an error has been made.

Fig. 4 is a side elevation of row 1 or the total row, and shows the mechanism in connection with this bank which under the control of the "Error" key may release the machine when an error has been made.

Fig. 5 is a detail of a part of the mechanism in connection with the totalizers to cause the machine to lock when an error has been made in the totalizer, and the totalizer does not come to zero when said totalizer or crossfooter has an error therein.

Fig. 6 shows the same mechanism as Fig. 5, except that it is in the position shown when the crossfooter stands at zero, so that the machine may be released at this time.

Figure 7:
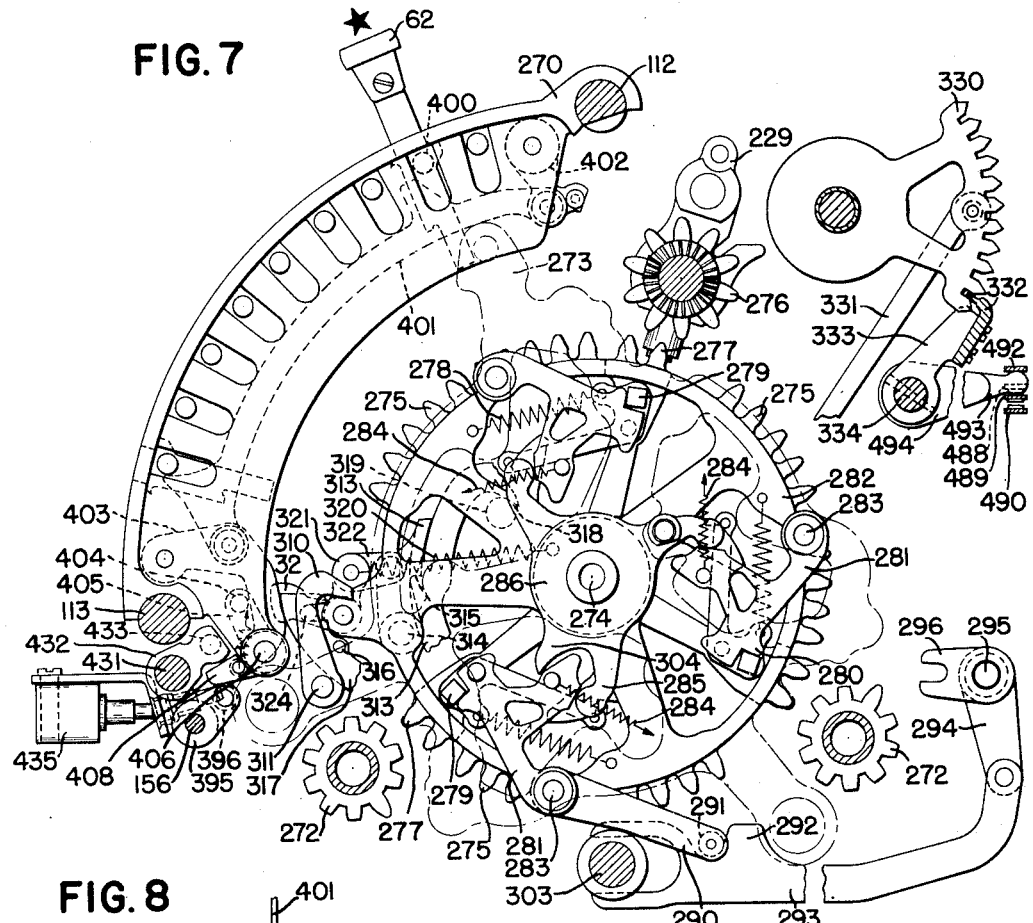
Fig. 7 is a side elevation of the lowest order item count bank which bank also carries the special or star key.

Fig. 10 is a side elevation, partly broken away, showing a portion of row 1 or the total row, and also a portion of the combination bank mechanism, the latter being used to control the printing of data under control of the keys, or used to control the printing of data under control of the highest order totalizer wheel, both row 1 and the combination bank combine to control the machine under certain conditions when errors have been made.

Fig. 11 is a wiring diagram for controlling the release of the machine under certain conditions when an error has been made.

Fig. 12 is a detail view showing one electrical switch in the machine release circuit and operated only when an error has been made and also another switch operable to complete a holding circuit for the sorting box indicator operating magnet.

Fig. 13 shows a portion of the machine releasing mechanism, the triping mechanism for said machine releasing mechanism, and the electrical means which operates said tripping mechanism.

Fig. 14 shows a portion of a compartment indicator and a part of its operating mechanism in normal position.

Fig. 15 shows the same mechanism as that shown in Fig. 14, but in moved position.

Fig. 16 shows one of the sorting compartments with the indicator in its non-indicating position and also shows an indicator for an adjacent compartment also in its non-indicating position.

Fig. 17 shows one of the sorting compartments with the indicator in its normal position in which the compartment is closed against the insertion of a check being manually sorted.

Fig. 18 shows a wiring diagram of the controls for controlling the delayed action on the compartment indicator.

Fig. 19 shows the switches for controlling the holding circuit for the compartment indicator operating solenoid.

GENERAL DESCRIPTION

Described in general terms, the machine embodying the present invention is of the type generally disclosed in the above mentioned Shipley, Goldberg and Spurlino patents. These patents disclose a plurality of totalizers into which may be distributed various amounts, according to the business system for which the machine is built.

The invention is particularly adapted to be used on a machine shown in the above mentioned Spurlino and Rauch Patent No. 2,361,622, which machine is what is known as a bank proof machine, used in banks, and the totalizers in such machines are adapted to receive the many and various items constituting individual transactions that are handled in the ordinary banking business.

The patents mentioned also disclose what are known in the art as "add and subtract totalizers" or "crossfooters," from which balances may be printed at any time desired.

The machine with which the present invention is adapted to be used has a master tape or audit strip and also a plurality of individual detail strips, and is also adapted to print what is known as a departmental total slip when taking totals of the various departments.

The machine keyboard is arranged for taking care of all business in connection with the bank whereby all transactions handled by the bank may be listed in this machine and a record made of each of these transactions. The machine is therefore provided with the usual banks of amount keys of sufficient capacity to take care of the ordinary business of any bank.

There are also three rows of what are known in the art as control keys, for the purpose of selecting various totalizers for the distribution of the transactions entered in the machine. There is also a row of total taking control keys which control the machine for the purpose of taking totals from the various totalizers at the close of the day when it is desired to clear out the machine to render it ready for business the following morning.

Sorting racks which are used in connection with the present invention are of the general type shown in the Spurlino and Rauch Patent Nos. 2,361,662 and 2,416,598.

However, the indicator devices in the present invention are larger than the indicator devices shown in the Spurlino and Rauch patents. In those patents the indicator devices do not cover the entire tops of the sorting compartments, whereas in the present invention, as is particularly shown in Figs. 16 and 17, the indicator devices cover substantially the entire tops of the sorting compartments, and the indicator devices in the present machine have a control which has been herein termed a delayed action device, which causes the indicator to remain open for a certain period of time after the completion of the operation of the machine. This gives the operator more time to deposit and sort the checks in the indicated compartments than was previously had in connection with the earlier machine, such as that disclosed in the above mentioned Spurlino and Rauch patents. Moreover the indicators in the present invention are so controlled as to be immediately operable on the depression of the selecting keys, which are for example, the keys in rows 3 and 4, shown diagrammatically in Fig. 1, whereas in the earlier machines the indicators do not operate until after the differential mechanisms have started to move.

The machine is provided with a "star" key, which under certain conditions controls the release of the machine when an error has been made, and also controls one of the special differential mechanisms in this machine, which is known as a combination bank differential, which will be hereinafter described in detail.

When an error has been made, such error will not show up until the operator takes the total from the crossfooter, at which time, if the crossfooter is not at zero it means that somewhere along the line an error has been made, because the crossfooter at the end of a particular run of checks should stand at zero, and when in this position the machine can be released. However, if the crossfooter is not at zero the machine cannot be released when the operator presses the "Error," alone, key to clear the crossfooter, and therefore an error has been made.

When any error has been made, the operator first reads the crossfooter by depressing the "Lock Release" key in row 2 and then depressing the "Error" key in the total row, or row 1, as shown in Fig. 1. The reading of this crossfooter will tell the operator how much the error was, and then she will refer to the master tape and find the error; then press the key corresponding to the compartment having the error check therein. She will then next set up the complement of the amount which caused the error and then press the "star" key. The depression of this star key makes a normal differential bank out of the highest order amount bank, which is normally a combination bank or a print bank, that is, it does not add into the totalizer.

The "star" key also allows all item count banks to add 9 to correct the item count. The adding of 9 in the item count totalizer in each of the denominational orders thereof is the same as subtracting 1 from the total of the count. This is done so as to have the item count correct because the operator has to run another operation after the error has been found, to set up the proper amount which was on the check.

After the amount has been set up on the amount banks, that is, the complement of the amount which caused the error, the "star" key is pressed. The depression of this key makes the combination bank add. The operator then presses the plus key in row 2, and this releases the machine and the complement set up on the keyboard is added into the crossfooter, the addition of said complement brings the crossfooter to zero; and then from that point on the operator can start running a new batch of checks.

DETAILED DESCRIPTION

Keyboard

The keyboard of the machine is shown partly, in diagrammatic form in Fig. 1, and includes 10 rows or banks of amount keys 61. A "star" key 62 is shown in the 8 position of the righthand row of the check counting differentials, and the purpose of this key will be hereinafter described.

A row of keys 63 is normally used to control the printing of data set up by the keys in this bank. This is what is known in the art as a combination bank, and as above mentioned, normally is used as a print bank. However, when the "star" key 62 is depressed, this bank of keys 63 is transformed from a print bank into a bank whereby its differential mechanism is controlled by the highest order of the crossfooter totalizer.

Now beginning at the right side of the keyboard, there are four rows of keys 65, 66, 67 and 68, which are marked row 1, row 2, row 3, and row 4, respectively. The keys 65 are total controlling keys and the keys 66, 67 and 68 control the machine for various types of operations.

For illustrative purposes, the keys of the third and fourth rows are designated for the purpose of entering debits from various local banks and transit banks.

Prior to entering these debits, the total amount of the entire block or debit is first entered in the crossfooter by setting such amount on the amount keys 61, then depressing the plus key 20 in row 2, when the transaction relates to customers' deposits. This, of course takes place after the amount of the total has been set up on the keyboard. This total amount goes into the plus side of the crossfooter, and, as each of the various debits is entered into the machine, which debits may be distributed into any one or all of the totalizers associated with the keys in row 3 and at the same time each debit is subtracted from the crossfooter so that at the end of the entry of the several items of this particular batch the crossfooter should be clear, which, of course is proof that the items are properly listed and recorded. These items may come from the teller's cage, and usually are the deposits made by customers having checking accounts in the bank.

There is also associated with the machine, as above mentioned, a sorting device consisting of boxes or compartments, into which the checks are placed by the operator after they have been listed in the machine. Each of the bins or sections into which the checks are to be placed after they have been listed carries, in the present instance an electrically operated indicator, which is operated immediately upon the depression of the keys of rows 3 and 4.

The operator then deposits the check in the bin which has been selected, as indicated by the operation of the indicator. Should, at the end of this run, the crossfooter not stand at zero, when the operator goes to clear the crossfooter, the machine cannot be released due to a locking mechanism which will be hereinafter described, and therefore a particular series of machine operations must be made to determine the amount of the error and correct the error.

Upon an error, the operator first reads the crossfooter by depressing the Error key 65 in row 1, which will read or take a sub-total of the crossfooter, thereby permitting the operator to determine the amount of the error. After this amount has been found, the operator then looks on the master tape to determine where the error was made, and having found that, then depresses the key corresponding to the bin having the error check. After this the operator sets up the complement of the amount which caused the error on the keys 61 and 63, and then depresses the star key 62. The star key causes the differential mechanisms associated with the check count differentials to go to the 9 position to add 9 into the subtract side of the crossfooter, thus causing 1 to be actually added into the crossfooter to correct the error of the check count. Depression of this star key 62 also changes the row of keys 63 from a reading control bank to a bank whereby the differential mechanism associated with these keys is now set under control of the amount which is now on the crossfooter, so that the amount of the error can be added into the subtract side of the crossfooter.

Machine release mechanism

In Fig. 13 there is shown the machine release mechanism, including a release shaft 70, a part of the mechanism for rocking it in a counter-clockwise direction to release the machine, the machine release shaft tripping mechanism, and the electrical device which operates said machine release shaft tripping mechanism.

The means for restoring the shaft 70 to its normal position is not shown herein, but is identical with that which is fully illustrated and described in the above mentioned Shipley Patent No. 1,619,796, and if a description thereof is desired, reference may be had to that patent for the same.

The machine release shaft 70 (Fig. 13) is adapted to be moved in a counterclockwise direction by a strong spring 71, mounted in a slot 72 of a link 73 in exactly the same manner as is fully illustrated and described in the above mentioned Shipley Patent No. 1,619,796. The spring 71 sets on a finger 74 of the link 73 and also engages fingers 75 of arms 76 (only one arm being shown), which arms are mounted on each side of the link 73. A stud 77 carried by the arms 76, projects into an arm 78, which is secured to the machine release shaft 70. Also secured to the machine release shaft 70 is an arm 79 carrying a flat-sided pin 80.

The shaft 70 is held in its normal position by the upper end of a trip lever 81, which is engaged by the flattened pin 80 and held in such engagement by the spring 71. This tripping lever 81 is pivoted on a stud 82, carried by the left side frame (not shown).

It might be stated here that the link 73 and arm 78 are mounted adjacent the right side frame of the machine in their normal positions.

The tripping lever 81 carries a stud 83, by means of which said tripping lever 81 is connected to a link 84. This link 84 is connected by means of a long stud 85, to a solenoid core 86 of a solenoid 87 mounted on a bracket 88, secured to the left side frame (not shown). A spring 89, connected to the link 84 and to a bracket 90, secured to the left side frame, normally maintains the parts in the positions shown in Fig. 13, whereupon the upper end of the tripping lever 81 is beneath the flat stud 80 of the arm 79, which it will be remembered is secured to the machine release shaft 70. A finger 91 on the lower end of the tripping lever 81 is normally held by a spring 89 in contact with a resilient sound-deadening block 92 of rubber or similar material secured to the bracket 90.

By means to be hereinafter described, the solenoid core 86 is moved to the left, as viewed in Fig. 13, in the direction of the arrow, thus pulling the link 84 in the same direction, which rocks the tripping lever 81 clockwise, removing its upper end from beneath the flat pin 80, whereupon the strong spring 71, through the medium of the stud 77 and the arm 78 rocks the machine release shaft 70 counterclockwise until a surface 93 of the arm 78 contacts a limiting pin 94 carried by the machine right side frame (not shown).

Such movement of the machine release shaft 70, as has been clearly illustrated and described in the above mentioned Shipley Patent No. 1,619,796, closes a circuit through a machine operating motor, thus driving the machine through a normal cycle of operation.

The solenoid 87 is energized upon the closing of certain microswitches, which will be hereinafter described in connection with the particular part of the control of the operation of the release of the machine by certain of the control keys.

In order to prevent an operator from accidentally or intentionally holding down any one of the operating keys, that is, keys which when depressed cause the machine to be released and be driven through an operation of the machine (and thus causing an immediate second operation of the machine), there is provided a usual non-repeat pawl 96 pivoted on the stud 82, and having a stud 97 held in contact with a surface 98 of the tripping lever 81 by means of a spring 99.

The pawl 96 is slightly higher than the upper end of the tripping lever 81, and consequently when the pin 80 is released by the tripping lever 81 and moved downwardly under the tension of the spring 71, it is moved downwardly to the left of the tripping lever 81 and to the right of the non-repeat pawl 96, thus holding the tripping lever 81 in its released position at the end of the operation of the machine, and until after the arm 79 is restored clockwise to a position slightly above that shown, and then finally restored to the position shown in Fig. 13. At the time the arm 79 is slightly above the position shown, the circuit through the solenoid 87 is broken and consequently the spring 89 can restore the solenoid core 86 and the link 84 to the right, to the position shown, thus moving the tripping lever 81 to the position shown, so that when the arm 79 finally assumes the position shown, the flattened pin 80 will be directly above the upper end of the tripping lever 81.

Transaction key banks

Only one of the transaction or control banks of rows 2, 3 and 4, has been shown as the keys in these banks are all substantially the same and are all mounted in substantially the same manner. Therefore, the row 3 bank of keys 67 has been shown in Fig. 2. This particular row has been chosen because of the fact that the keys in this bank control a microswitch, which in turn is in circuit with the above described solenoid 87 to in turn control the release of the machine when said solenoid operates the tripping mechanism above described.

Since the rows of keys 66, 67 and 68 are all identically mounted, it is believed that the description of the bank of keys 67 will suffice for all. With this in mind, and referring particularly to Figure 2, there is shown a key frame 111 mounted on rods 112 and 113, carried by the machine side frames, in exactly the same manner as shown in the above mentioned patents, and particularly the above mentioned Shipley Patent No. 1,619,796.

Each key 67 of this transaction bank in row 3 (Fig. 2) carries a pin 114, each pin adapted to cooperate with an associated slot 115 of a releasing bar 116, pivoted at its upper end to an arm 117, pivoted at 118 on the key frame 111, and to an arm (not shown), pivoted near the lower end of the key frame 111. Associated with each of the keys 67 is a coil spring (not shown) which is of the usual type, which is adapted to hold the keys in their normal undepressed positions in a manner which is well known in the art. A spring (not shown) maintains the bar 116 in the position shown in Fig. 2 against the key pins 114 in the normal positions of the parts in a manner which is well known in the art.

When the key 67 is moved into its depressed position, and latched in that position by means later described, the arm 117 (Fig. 2), by means of a pin 121 carried thereby, contacting a finger 122 of an arm 123, pivoted on a rod 124, rocks said arm 123 in a counterclockwise direction. The arm 123 also carries a pin 126, which is connected to a link 127, pivoted at 128 to an arm 129, pivoted on the machine release shaft 70.

The arm 129 has a lip 130, adapted to cooperate with a switch plunger 131, which operates a microswitch 132, supported on a bracket 133. The bracket 133 is secured to a machine frame brace 134 by means of screws 135.

When the keys 67 are in their normal undepressed positions, as shown in Fig. 2, there is a clearance indicated at 136, between the lip 130 and the switch plunger 131.

Upon depression of any one of the keys 67, its pin 114 moves the bar 116 and rocks the arm 117 clockwise (Fig. 2) and the pin 121 rocks the arm 123 counterclockwise. This causes the link 127 to raise and rock the arm 129 counterclockwise. While this is occurring, the pin 114 of the key 67, is moving a retaining detent 141 downwardly against the tension of a spring (not shown) in the usual manner, and just as soon as a flattened part 142 of the pin 114 passes beneath the nose of the detent 141 and gets beneath a shoulder 143, the spring moves the detent 141 upwardly again into the position shown in Fig. 2, thus retaining the depressed key 67 in its depressed position in the usual manner.

The relations of the parts, that is, the shoulder 143 to the clearance 136 are such that the detent 141 latches the key 67 in its depressed position just as the lip 130 touches the end of the microswitch actuating plunger 131. At this time the key is further depressed, whereupon the arm 129 is rocked still further in a counterclockwise direction to move the switch plunger upwardly a distance sufficient to close the contacts of this microswitch 132, which are normally in an open condition. The usual key spring then returns the key 67 slightly upward until the flattened part 142 contacts the shoulder 143, which retains the key in its depressed position. Such upward movement of the key 67 is sufficient to permit the arms 129 and 123 to rock slightly clockwise thus removing the lip 130 from the plunger 131 whereupon the microswitch 132 opens and thus breaks the circuit to the solenoid 87 which is thus deenergized.

When this microswitch 132 is closed it completes a circuit through the previously described solenoid 87, which has for its purpose the function of operating the machine release tripping mechanism so that just as soon as one of the keys 67 is completely depressed, the machine releasing mechanism is released and can function to cause the machine to go through the normal cycle of operation.

However, there is a certain condition, such as when an error has been made, when this switch will not function in this manner. That condition and the complete circuit will be hereinafter described at the proper time.

The keys 66 of row 2 and the keys 68 of row 4 are each associated with a release bar identical with the release bar 116, whereupon the depression of certain of the keys 66 and any one of the keys 68 will operate the microswitch 132 as do the keys 67 of row 3 in the manner above described. To accomplish this the arm 123 is connected by a bail 144 (Fig. 2) to arms associated with the keys 66 and 68, which arms are substantially like the arm 123, so that when certain of the keys 66 or any one of the keys 68 is depressed the microswitch 132 will be closed in the manner above described in connection with the keys 67, and for the same purpose.

As has been previously mentioned, there is employed in connection with the present invention a group of sorting compartments which form a unit, and which may be either attached to or separated from the accounting machine. These compartments are selected for the operator to manually sort the checks therein by the use of the keys 67 of row 3 and the keys 68 of row 4, and also certain of the keys 66 of row 2. Such keys 66, 67 and 68 are used to perform all of the usual functions of such types of keys in the accounting machine, namely, release the machine for operation and control the selection of the totalizers and the adjustment of the printing and indicating mechanisms. Said keys 66, 67 and 68 above mentioned, also are arranged herein to perform the added function of selectively controlling the operation of indicators on and used in connection with the sorting compartments in such a manner as to indicate to the operator the compartment into which she should file record material from which she has entered into the accounting machine, said compartment of the sorting device corresponding to the classification key operated.

Therefore, each of the keys 67 carries on its pin 114 an insulating roller 146 (Fig. 2), which serves to hold open contacts 147 and 148 while the key 67 is in its normal undepressed position. Both of the contacts 147 and 148 are suitably insulated from their respective mountings. The contact 147 has a normal tendency to move downwardly to engage the contact 148, but is restrained from doing so by the undepressed key 67 above described. A contact bar 149, suitably mounted in the key frame 111, is connected to all of the contacts 147.

For a further detailed description and illustration of these contacts reference may be had to the Spurlino and Rauch Patent No. 2,416,598, above mentioned.

There may be times when, after an error has been completed, it is desirable to release the machine without going through the usual error correction procedure, and when this is desired, the operator depresses the "Lock Release" key 66 of row 2.

This lock release key 66 closes a microswitch so that the machine can be released for operation. This mechanism will now be described.

Referring to Figs. 2 and 3, there is mounted on the usual machine tie rod 150 a lever 151, having a nose 152, which cooperates with a key pin 153 in the lock release key 66. Pivoted to the lever 151 is a link 154 in turn pivoted to an arm 155, freely mounted on a shaft 156, supported by the machine side frames. Connected to the arm 155 is a finger 157 adapted to cooperate with a spring plunger 158 mounted in a bushing 159, which is supported by a bracket 160 carried by the machine frame. This spring plunger 158 is adapted when depressed to operate a plunger 161 of a microswitch 162 to close said switch which is normally in an open position.

Upon depression of the lock release key 66 its pin 153 rocks the lever 151 counterclockwise, whereupon the link 154 rocks the arm 155 and finger 157 clockwise, causing the finger 157 to depress or move the spring plunger 158 to the left to in turn move the microswitch plunger 161 to the left to close the contacts of the microswitch 162, whereupon the machine may be released for operation, that is, the machine release tripping mechanism previously described is operated which in turn permits the machine release shaft 70 to be operated by its spring 71 (Fig. 13) in the manner previously described.

The bank of transaction or compartment selecting keys 68 of row 4 are identical with those keys 67 of row 3, which have been previously described, and therefore, no further description need be given of them.

Total key bank

The total keys 65 of the total row or row 1 will now be described. In this control bank there are six control keys 65 having the captions shown in Figs. 1 and 3. These keys are slidably mounted in a key frame 176 in turn supported on the previously described rods 112 and 113. Each of the keys has a flattened stud 177, cooperating with the angular face of a nose 178 on a retaining detent 179, which is slidably mounted on the frame 176 in the usual manner. The angular faces of the noses 178 are normally held in contact with pins 177 by a spring 180.

Whenever one of the keys 65 is depressed its pin moves the detent 179 upwardly, as viewed in Fig. 4, until the flattened portion of the pin 177 is below a surface 181 of the nose 178, whereupon the spring 180 again moves the detent back to the position shown in Fig. 4, thus retaining the depressed key in its depressed position.

Each of the keys 65 has a pin 187, which is in axial alinement with the pin 177 previously described. The pin 187 of the "Error" key 65 cooperates with an angular slot 188, and the pins 187 of all the rest of the keys 65 cooperate with straight-sided slots 189 of an operating bar 190 slidably mounted on pins 191 supported by the frame 176. A spring 192 normally holds the left side of the slot 188 against its pin 187 and also holds the left sides of the slots 189 against their associated pins 187. All of the keys 65 are maintained in their normal positions by means of compression springs 193, one of which is associated with each of these keys 65. These springs 193 function in the normal way, which is well known in the art. The operating bar 190 carries a pin 200, which is engaged by a forked arm 201, pivoted on the rod 124. Connected to the arm 201, by means of a hub 202, is an arm 203 which is connected by a link 204 to an arm 205, pivoted on the machine release shaft 70. The arm 205 has a lip 206 adapted to cooperate with a plunger 207 which operates the contacts of a microswitch 208 in a manner hereinafter described. The microswitch 208 is mounted on the previously described bracket 133.

Whenever the Error key 65 is depressed, its downward movement causes its pin 187 to move the control bar 190 downwardly, thus rocking the arm 201 and also the arm 203 in a counterclockwise direction whereupon the link 204 rocks the arm 205 counterclockwise and causes the lip 206 to engage and move the plunger 207 upwardly to close the contacts of the microswitch 208, which completes the circuit through the previously described solenoid 87 (Fig. 13) to operate the machine release tripping mechanism so that the machine may be released for operation upon the depression of the Error key 65.

When any of the other five keys 65 of this control row is depressed, due to the fact that the slots 189, which cooperate with the pins 187 of these keys are straight, the depression of any of said keys consequently does not move the bar 190, and therefore, the microswitch plunger 207 is not operated. Consequently the machine cannot be released upon the depression of any of the first four upper keys 65 or the bottom keys 65 of row 1 or the total control row.

A clearance 209 (Fig. 4) between the lip 206 and the plunger 207 is sufficient to permit the depressed Error key 65 to have its stud 177 below the shoulder 181 of the nose 178 of the retaining detent 179 so that the key will be positively locked in its depressed position before the plunger 207 is moved a distance inwardly sufficient to close the contacts of the microswitch 208 in identically the same manner as was described in connection with the lip 130 and the plunger 131, which are associated with and operated by certain of the keys 66 of row 2 and any of the keys 67 and 68 of rows 3 and 4.

Differentially positioned under control of the keys 65 of row 1 is a total control plate 211 of the usual type, such as shown in the Spurlino et al. Patent No. 2,373,510. Pivoted to this control plate 211 is a link 212 connected to a bell crank 213 secured to a shaft 214, supported by the machine side frames. Also secured to this shaft 214 is a gear segment 215, meshing with a gear segment 216 which is secured on a shaft 217. The differential positioning of the plate 211, under control of the keys 65 through the train of mechanism just described, sets up a printing device to print characters corresponding to the depressed keys 65, as is fully illustrated and described in the above mentioned Spurlino et al. Patent 2,373,510.

Whenever the error key 65 is depressed the plate 211 is moved counterclockwise under control thereof, thereby through the link 212, arm 213, segments 215 and 216, rocking the shaft 217 counterclockwise, which rocks a notched plate 220 likewise. This plate 220 is provided with a notch 221 to cooperate with a roller 222, carried by a bell crank 223. This roller 223 is normally held against the true periphery of the plate 220 by a spring 224. This bell crank 223 is pivoted on a stud 225 supported by the machine frame. The bell crank 223 also carries an insulating roller 226, cooperating with a switch 227 mounted on a bracket 228 which is supported by the machine side frame. This bell crank 223 holds the switch 227 normally closed, as shown in Fig. 12. This switch is in circuit with the starting magnet 87, as shown in Fig. 11.

Whenever the Trror key 65 is depressed and the plate 220 moved counterclockwise, so that the notch 221 is opposite the roller 222, the spring 224 rocks the bell crank 223, thus permitting the switch 227 to open and thus break a circuit through the solenoid 87 to prevent operation of the solenoid 87, and thus release of the machine by closing switch 132 by operation of a key 67 or 68, when there is an error in the crossfooter.

*Locking mechanism for the machine releasing mechanism*

After a batch of checks has been sorted and the total is taken, if the crossfooter does not come out at zero on the plus side, there has been an error made in the subtracting of the number of checks from the total, which was originally put in the crossfooter, and therefore it is desirable to lock the machine so that the error may be corrected before the operator starts another batch of checks for sorting.

Therefore, the machine release shaft 70 is prevented from moving its full clockwise movement to release the machine for certain kinds of operations; for example, as above mentioned, when an error has been made; in other words when the crossfooter does not stand at zero at the end of a series of operations involving the sorting of checks of a particular batch.

The mechanism for causing this lock-up of the machine, that is, the prevention of the release of the machine when an error has been made and the crossfooter is not at zero, will now be described.

Secured to the plus wheel of each of the denominal orders of the crossfooter is a disk 230 (Figs. 5 and 6) having a notch 231.

The crossfooter used in the present machine is substantially identical with the crossfooter shown in the above mentioned Colley Patent No. 2,390,870, the Spurlino et al. Patent No. 2,361,662, and also the Spurlino et al. Patent No. 2,375,594.

When the crossfooter is at zero the minus wheels all stand at 9 and the plus wheels all stand at zero, and when in this condition a pawl 232 (Fig. 6) engages the notch 231. This pawl is secured to a shaft 233, carried by the usual totalizer frame 229. There is a pawl 232 for each denomination order of the crossfooter, in order to cooperate with each of the notched disks 230.

When the crossfooter is in disengaged position, as shown in Figs. 5 and 6, the pawl 232 is held either in engagement with the notch 231, as shown in Fig. 6, or in contact with the periphery of the disk 230, as shown in Fig. 5, by a torsion spring 234, having one end secured in the totalizer frame 229 and the other end to a pin 235 of an arm 236 secured to the shaft 233. Also secured to the shaft 233 is an arm 237 adapted to cooperate with a pin 238 secured in the machine side frame.

Since the shaft 233 is carried by the totalizer frame 229, it will receive a movement downwardly as the totalizer is being engaged with the totalizer actuators, not shown herein but similar to those shown in Fig. 7, in connection with the item count bank. During this downward movement of the crossfooter and the shaft 233, the arm 237 strikes the pin 238 and rocks the pawls 232 counterclockwise to disengage them from the notches 231 just prior to the time the crossfooter becomes fully engaged with the actuators, so that the totalizer can be properly operated by the actuators.

Then, after the totalizer has been operated to either add or subtract, as the case may be, it is disengaged from the actuators and during this disengagement, as the arm 237 leaves the pin 238, the spring 234 will rock the shaft 233 and the pawls 232 clockwise until the pawls 232 engage the notches 231 of the disks 230, assuming, of course, that the adding wheels of the crossfooter stand at zero. If any of the wheels do not stand at zero, then the pawl 232 coacting with such wheel and disk 230 associated with that wheel, engages the periphery of the disk 230, and consequently will not be rocked quite so far in a clockwise direction by the spring 234 as it would if it could be engaged with the notch 231. Since all of the pawls 232 are secured to the shaft 233, all pawls are held in such position by any one disk 230. This of course means that when any one of the various denominational orders of the crossfooter do not stand at zero its respective disk 230 will not present its notch 231 to the pawl 232 and consequently the machine releasing mechanism will be locked, due to the fact that the crossfooter is not at zero on the add side thereof.

At the end of the running of a batch of checks and subtracting the amount of each check from the amount which was originally put on the plus side of the crossfooter at the beginning of the operation of the machine, the crossfooter should stand at zero.

However, should there have been an error made the crossfooter will not be at zero at the end of such run of checks, and should the operator wish to start another series of checks the machine could not be released for operation upon the depression of a plus key, which is necessary to put into the crossfooter the total amount of the batch of checks. This is due to the fact that when the crossfooter is not at zero, as above mentioned, the pawls 232 are in the position shown in Fig. 5, and when in this position they control mechanism to prevent the clockwise releasing movement of the machine release shaft 70.

However, during the sorting of a batch of checks, as each check is entered into the machine and subtracted from the total which was first put in the machine, these pawls 232 also assume the position shown in Fig. 5, after the subtraction of the amount of the first check which is being sorted. Therefore, means is provided in this machine to free or unlock the machine release shaft 70 upon the depression of any of the minus keys in rows 2, 3 and 4, or upon the depression of the lock release key.

Associated with each of the rows of keys 66, 67 and 68, namely, rows 2, 3 and 4 (Fig. 1) is a release bar 240, only one of which is shown, that being in Figs. 5 and 6, and being the one associated with the key 67 of row 3. This bar is operated by the key pin 114 of any of the keys 67.

An identical bar is operated by any of the minus keys 68 in row 4. However, in connection with the minus keys 66 in row 2, and the lock release key 66, there is attached to the release bar 240 of the keys of row 3 a bar similar to the bar 240 and the key pins of the keys 66 of row 3 extend across a sufficient distance to cooperate with this bar.

This bar 240 carries a pin 241 adapted to cooperate with a finger 242, secured to a yoke 243 and pivoted on the shaft 124. This yoke 243 also carries an arm 244, the end 245 of which is adapted to cooperate with a flange 246 of an arm 247, which is secured to the machine release shaft 70.

Secured to a shaft 250, supported by the machine frame, is a yoke 251. This yoke 251 has an arm 252, and a spring 253 connected thereto holds a finger of this arm against a stationary stud 254. This is the normal position of the yoke 253, as shown in Fig. 6.

Rigidly secured to the previously described shaft 233 is an arm 255 normally held in the position shown in Fig. 6 by the spring 234.

The shaft 233 is moved downwardly when the crossfooter is moved into engagement with the actuators and this shaft 233 receives a counterclockwise movement before the crossfooter is engaged with the actuators, occasioned by the contact of the arm 237 with the stationary pins 238. Counterclockwise movement of the shaft 233 positions the arm 255 beneath the yoke 251, after the shaft 233 has been moved downwardly with the totalizer frame 229.

Assuming now that the crossfooter is not at zero, this would leave the notch 231 in the position shown in Fig. 5 when the crossfooter is disengaged from the actuators. Consequently the pawl 232 could not be rocked clockwise by the spring 234 as early as described upon disengagement of the crossfooter from the actuators, and therefore as the totalizer is disengaged or moved upwardly into the position shown in Fig. 5, the upward movement of the shaft 233 causes the arm 255 to strike the yoke 251 and rock said yoke 251, the shaft 250, and the arm 252 in a counterclockwise direction from the position shown in Fig. 6 to the position shown in Fig. 5. Integral with the above described yoke 243, which is pivoted on the shaft 124, is an arm 260, which is normally held in contact with a stud 261 on the arm 252 by a spring 262 connected to pins on the arms 252 and 260.

From the above description it will be clear that when the arm 252 is rocked counterclockwise by the arm 255, as above described, the spring 262 will rock the arm 260, the yoke 243, and the arm 244 in a clockwise direction from the position shown in Fig. 6 to the position shown in Fig. 5, whereupon the end 245 of the arm 244 is directly in the path of movement of the flange 246 on the release arm 247 of the machine release shaft 70, and consequently will prevent sufficient clockwise movement of the arm 247 to release the machine.

A description has just been given as to how the machine releasing mechanism is locked whenever the crossfooter does not stand at zero. This, as above mentioned, prevents the release of the machine by depression of any of the plus keys 66 in row 2 or the single plus key 67 in the bottom of row 3. However, when entering the amounts of the checks, the entry of which constitutes a subtract operation, it is necessary that the machine release shaft 70 be operated each operation, notwithstanding the fact that the crossfooter is not in its zero position and notwithstanding the fact that the end 245 of the arm 244 is in front of the flange 246 and prevents movement of the arm 247, and consequently the machine release shaft 70.

Therefore, there is associated with each of the subtract keys 67 and 68 in rows 3 and 4, respectively, and also a member associated with the subtract keys 66 of row 2, and the lock release key in row 2, means to move the arm 244 away from the path of movement of the flange 246 for subtract operations. This means comprises, as has been previously stated, the bar 240, shown in Figs. 5 and 6, there being one associated with the key 67 of row 3, and the key 68 of row 4 so that when any of the subtract keys in either of these two rows is depressed the bar 240 will be moved toward the left, as viewed in Figs. 5 and 6, and the pin 241 thereof, by its contact with the finger 242 will rock the finger 242 and its integral arm 244 counterclockwise from the position shown in Fig. 5 into the position shown in Fig. 6, thus moving the end 245 of the arm 244 out of the path of movement of the flange 246 on the machine release shaft arm 247, and consequently this shaft 70 then can be given its full clockwise movement, which is necessary to release the machine, as has been previously described.

When any of the subtract keys 66 are depressed, their pins extend across the bar above mentioned but not shown, which is attached to the bar 240, associated with the key 67 of row 3, so that whenever any of these subtract keys 66 in row 2 or whenever the lock release key of row 2 is depressed, the arm 244 will be moved from the position shown in Fig. 5 into that shown in Fig. 6 so that the machine may be released for operation. At the end of these operations, however, the spring 262 restores the arm 244 back into the position shown in Fig. 5, due to the fact that this arm 244 is connected through the bail 243 to the arm 260, which is rocked clockwise by the spring 262.

The lock release key 66 is used to free the machine release shaft 70 when an error has been made and the operator finds out that such an error has been made and depresses the Error key 65 of row 1. However, this being a so-called release key, that is, it operates a solenoid which is in circuit with the machine release solenoid 87, but if the shaft 70 is blocked from movement, even the depression of the Error key 65 will not cause the release of the machine and therefore the lock release key, which is a "non-repeating key," must be depressed in combination with the Error key before the machine can be released by depression of the Error key because the depression of the lock release key, as has been previously stated, causes the arm 244 (Fig. 5) to be moved from the locking position shown herein into the ineffective or unlocking position which is shown in Fig. 6, as has been previously described.

*Item count mechanism*

To the left of the bank of keys 63 (Fig. 1) there are four key bank frames 270, only one of which is shown, that being in Fig. 7, which key frames are mounted on the previously described cross rods 112 and 113. In the key frame 270, adjacent the bank of keys 63, is mounted the previously mentioned star key 62, the purpose and function of which will be later described.

In the three key bank frames 270 to the left there are no keys. There is, however, a differential mechanism associated with each one of these three key banks to the left of the bank carrying the star key 62, and these differential mechanisms are shown only in dot and dash lines and designated by the reference numeral 271 in Fig. 1. These differential mechanisms are standard differential mechanisms and substantially identical with the amount differential mechanisms shown in the previously mentioned Shipley Patent No. 1,619,796.

Associated with the key bank frame 270, shown in Fig. 7, which lies adjacent the bank of keys 63, there is a differential mechanism which is the units or lowest order differential for the item count mechanism.

This item count mechanism is for the purpose of counting 1 each time an item is entered in the machine, whether it be a subtract item or a plus item, and such item count is registered on individual totalizers 272 (Fig. 7) which are located on the usual front and rear totalizer lines in machines of this type, as shown in the above mentioned Shipley Patent No. 1,619,796. In other words, there is a totalizer 272 on the front line associated with each of the keys 67 of row 3, and the totalizer 272 on the rear line, associated with each of the keys 68 of row 4.

These four differential mechanisms for the item count mechanism are supported by the usual hanger plates 273 (Fig. 7) which are mounted in the usual manner. The differentials are tied together by means of a tie rod 274, in the usual manner.

Only that differential which is adjacent the row of keys 63 will be described, and this is the differential which is, as above mentioned, shown in Fig. 7. This differential mechanism consists of three totalizer actuators 275, which cooperate with the totalizers 272 on the front and rear lines.

The usual upper totalizer line extends across from above the amount keys and is shown in Fig. 7. All of the wheels 276 on this totalizer line are provided with long teeth, the purpose of which is to stop the differential mechanism in zero position when taking the totals from the totalizer which, by the way, is the crossfooter, located above the amount differentials associated with keys 61. This particular part of the totalizer above the item count differential mechanisms plays no particular part in this mechanism.

Adjacent each of the differential actuators 275 is the usual 2-tooth transfer segment 277, normally held in the position shown in Fig. 7, adjacent the actuators by a spring 278. This segment 277 carries a square pin 279, which in this particular differential mechanism is held against a shoulder 280 of the transfer lever 281, pivoted on the usual differential plates 282, which support the actuator segments 275. The pivot point for the transfer levers 281 is at 283. Connected to each of the transfer levers 281 is a spring 284, which normally holds these levers against the fingers 285 of a transfer arm restoring lever 286 which operates each operation of the machine in a clockwise direction to normally restore the levers 281 counterclockwise to their normal positions, as is fully illustrated and described in the above mentioned Shipley Patent No. 1,619,796.

This restoring movement of the transfer arm 281 by the restoring lever 286 and its fingers 285 takes place at the time the differential mechanism is in its zero position, at which time the square pins 279 of the transfer segment 277 are away from the shoulders 280 so as to permit the counterclockwise movement of the transfer arms 281 by the fingers 285 of the restoring lever 286, as has been fully illustrated and described in the above-mentioned Shipley Patent No. 1,619,796.

However, there is one condition in connection with this particular bank shown in Fig. 7, and that is that after the transfer arms 281 have been restored counterclockwise they do not remain in that position because there is nothing to retain them in such position, they being moved immediately back into the position shown by their springs 284. This is for the purpose of always adding one each operation of the machine when the differential moves from its zero position into the home position, at which time the transfer segments turn the totalizer wheels 272, which are engaged with those segments 277, one step to count "1" for that particular operation of the machine.

However, this item count mechanism above described, can take place only during adding or subtracting operations, or in other words, when the total plate 211 of row 1 (Fig. 10) is in its normal or add position. The means for controlling this and disabling the item count mechanism when the total control plate 211 is out of its add position, will now be described.

During the first cycle of each totalizing operation the transfer arms 281 are given their restoring movement by the restoring lever 286.

Integral with the lowermost one of the transfer arms 281, shown in Fig. 7 is an arm 290, carrying a pin 291 which normally lies in front of a lug 292 on a pitman 293 connected to an arm 294 (Fig. 10), which is secured to a shaft 295. Also secured to the shaft 295 is an arm 296, connected by a pin 297 to a bell crank 298, pivoted on a stud 299. A pin 300 on the bell crank 298 is held normally in contact with a node 301 of the total control plate 211 by a spring 302 connected to the bell crank 298. The free end of the pitman slides on the main operating shaft 303 of the machine.

The parts are shown in Fig. 10 when the total control plate 211 is in its add position, with the exception of the arms 290 and 291, which are shown in a position into which they are moved at the end of the restoring position of the transfer arm 281 by the restoring lever 286. As above mentioned, immediately after the restoring movement of the arm 281 the spring 284 moves the transfer arms 281 back into the position shown in Fig. 7, and consequently the arm 290 is moved downwardly into the position shown in Fig. 7, away from that shown in Fig. 10, wherein the pin 291 is again placed in front of the lug 292 on the pitman 293.

During the first cycle of a total-taking operation when the node 301 has been moved away from the front of the stud 300, then, when the transfer arms 281 are moved into their restored positions, which moves the arm 290 and stud 291 upwardly into the position shown in Fig. 10, the spring 302 then acts to rock the arm 296, arm 294, shaft 295, clockwise, thus moving the pitman 294 forwardly or to the left, as viewed in Fig. 10, whereupon the lug 292 is moved beneath the pin 291, thus retaining all transfer arms 281 in their restored positions. The lowermost transfer arm 281 engages a finger 304 of the transfer lever 286 to retain the righthand and upper transfer arms 281 in their restored positions when the lug 292 is beneath the roll 291 of the arm 290; or in other words, whenever the lowermost transfer arm 281 is retained in its restored position by the lug 292.

Such conditions remain until the end of the total-taking operation at which time the total control plate 211 is again restored to the position shown in Fig. 10, which through the stud 300 rocks the bell crank 298 clockwise, back into the position shown in Fig. 10, and this in turn, through the arms 296 and 294 restores the pitman 293 from its forwardly moved position into its rear position, shown in Figs. 10 and 7, whereupon the spring 284 rocks the transfer arm 281 clockwise and moves the pin 291 downwardly in front of the lug 292 on the pitman 293. As the lower arm 281 is moved away from the finger 304, the springs 284 of the two upper arms 281 rock the latter arms into the positions shown in Fig. 7.

Figure 8:
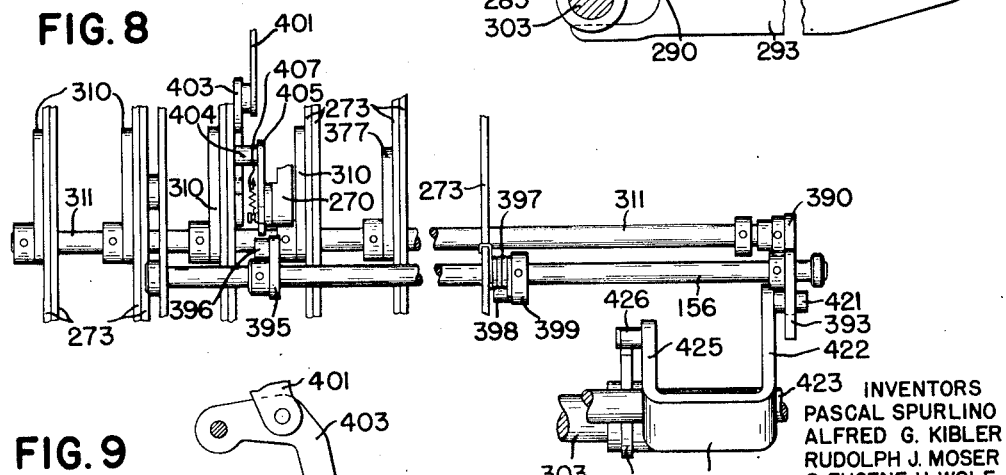
Fig. 8 is a front view showing a part of the mechanism for controlling the machine for its various functions.

To prevent the differential mechanism shown in Fig. 7, and also the three like differential mechanisms to the left, as above mentioned, from going beyond zero position, there is associated with each of these differential mechanisms a zero stop 310, all four of which are shown in Fig. 8. These zero stops 310 are all secured to a shaft 311, which is supported by the hangers 273.

To drive the differential plate 282 and the differential segments 275 first clockwise and then counterclockwise to home position, there is provided the usual driver 312 (Fig. 7) which is given a constant movement first clockwise and then counterclockwise by means not shown herein, which is driven from the main drive shaft 303. Such means is old and well known in the art and fully illustrated and described in the above mentioned Shipley Patent 1,619,796 and also in several of the other patents above mentioned. This driver 312 cooperates with a latch 313 which is pivoted at 314 to the differential plate 282. The latch is normally above a shoulder 315 on the driver 313, so that the clockwise movement of the driver carries the latch 313 and consequently the differential plate 282 in a clockwise direction until a pin 316 on the usual arm 317 of the usual reset spider, contacts the zero stop 310 thus disengaging the latch 313 from the shoulder 315 of the driver, and leaving the differential mechanism in zero position while the driver 312 continues on to its extreme clockwise position.

On the return of the driver 312 to its normal position a surface 318 thereof contacts a stud 319 on the differential plate 282 and rocks the differential counterclockwise from zero position to the home position, shown in Fig. 7, whereupon the latch 313 is returned into the position shown, above the shoulder 315 of the driver by means of the usual latch spring 320.

Pivoted to the differential plate 282 is the usual latch arm 321, which is connected by the usual link 322 to the latch 313. The forward end of the link 322 has an arm 323, carrying a pin 324, which is engaged by the front arm 317 of the usual reset spider.

As the driver 313 moves clockwise it carries the latch 313 therewith, whereupon the arm 323, and consequently the reset spider 317, are moved upwardly until the pin 316 strikes the zero stop 310, thus causing the arm 323 to stop and rock the arm 321 counterclockwise, whereupon the link 322 disengages the latch 313 from the foot 315 of the driver 312, so that the differential segments or actuators 275 will stop in their zero positions.

During sub-total and total operations the zero stops 310 are rocked counterclockwise out of the paths of their respective pins 316 but in these item count banks, as previously stated, the long teeth on the crossfooter wheels 276 cause the item count differentials to stop in the zero position so that totals or sub-totals are not printed from the item count totalizers 272. The zero stops 310 are also moved into ineffective positions under control of the star key 62 in a manner and for a purpose to be later described.

To aline the differential mechanism of Fig. 7, and also the differential mechanisms associated with the amount keys 61, there is provided the usual aligning segments 330, only one of which is shown in Fig. 7. These segments are set differentially under control of the amount keys 61, and also under control of all other differentials in the machine, by the usual beam link 331. An aligner 332 which is supported by arms 333 (only one of which is shown) which arms are secured to an aliner shaft 334. At the proper time and by a camming device operated from the drive shaft 303 in the manner shown in the last mentioned Shipley patent, the shaft 334 is rocked clockwise to disengage the liner 332 from all of the segments 330 while the differential mechanisms are being set, and then after they have been posiitoned under control of the differentials, the aligner 332 is again engaged with the segments 330 to maintain the set positions of the beam link 331 so that upon a second operation, the printing mechanism which is not shown herein, may be moved directly from one position to another without having to be moved back into its zero posiiton. This is known as a minimum movement device and is well known in the art.

*Combination differential mechanism*

As has been previously stated, there is associated with the bank of keys 63 what is known as a combination differential mechanism. This mechanism is used for the purpose of controlling printing mechanism to print data under control of the keys 63 and during totalizing operations this differential mechanism is adapted to be set under control of the highest order amount wheels, so as to print the amount from said wheels to obtain the complete total from the totalizers. Also during error correcting operations this differential is controlled to function as a normal adding differential.

Consequently this differential mechanism is in two parts, one of which includes the differential arm which is operated to set the printing mechanism each and every regular adding operation of the machine, and the other part, which constitutes and includes the totalizer actuators is normally coupled to the differential arm but during said regular adding operation said actuators are uncoupled from the differential arm.

Briefly, this combination differential mechanism, is substantially like that shown in the United States patent to Spurlino and Gruver No. 2,229,771.

This combination differential includes a differentially adjustable arm 350 (Fig. 10) mounted between hangers similar to the hangers 273, shown in Fig. 7, and tied together by the tie rod 274. This arm 350 carries a latch 351, pivoted at 352, and this latch 351 normally cooperates with a shoulder 353 on a driver 354 which is given a constant clockwise and then a counterclockwise movement during each operation of the machine by means fully illustrated and described in the above mentioned Shipley Patent No. 1,619,796.

Also pivoted on the arm 350 is an arm 355, the upper end of which has pivoted thereto a link 356, which is pivoted to the latch 351. This link 356 has an integral arm 357, which is used for alining and locking the latch in its disengaged position, as is illustrated and described in the last mentioned Shipley patent. The arm 355 also has a nose 358, adapted to contact the inner end of any of the depressed keys 63 in a manner which is also fully illustrated and described in the above mentioned Shipley patent, and which is also described in the Spurlino and Gruver Patent No. 2,229,771, above mentioned. As the arm 354 moves upwardly the latch 351 carries the arm 355 upward until the forward end 358 contacts one of the depressed keys 63, which causes the arm 355 to rock, and through the link 356, withdraw the latch 351 from the shoulder 353 of the driver 354, whereupon the differential arm 350 will be positioned in accordance with the key 63 which has been depressed. Upon the return movement of the driver 354 to its normal position, it contacts a pin 359 on the arm 350 and restores the arm to the normal position shown in Fig. 10.

Adjacent the arm 350 is the usual differential plate 370, carrying the usual actuator racks 371, and transfer segment 372, for cooperating with the totalizers shown in Fig. 7. This plate 370 is normally coupled to the differential arm 350 by a coupling pawl 373 pivoted at 374 to the differential plate 370. This coupling pawl 373 normally engages a flat-sided pin 375, carried by the differential arm 350. Consequently, the upward movement of the differential arm 350 would normally, through the pin 375 and coupling pawl 373, carry the differential plate 370 upwardly therewith and cause it to be set differentially under the position of the keys. However, the lower end of the coupling pawl 373 carries a pin 376 adapted to cooperate with a pawl 377, which is secured to the shaft 311. A spring 378, connected to a finger 379 of the coupling pawl 373, normally holds the coupling pawl in engagement with the flattened pin 375.

During the regular adding operations of the machine the shaft 311 and consequently the arm 377 are held in the position shown in Fig. 10 by means to be hereinafter described; consequently when the arm 350 is moved upwardly by the driver 354 the pin 376, riding along the righthand face of the arm 377 causes the coupling pawl 373 to be rocked counterclockwise and thus disengage it from the pin 375 of the differential arm 350, and this movement continues until the pin 376 arrives at and contacts the hook 380 of the arm 377, and consequently the differential plate 370 and the differential actuator 371 will not be moved upwardly differentially with the differential arm 350, due to the fact that the coupling pawl 373 is disengaged from the pin 375 on the differential arm 350. Therefore the totalizer overflow wheels are not affected during such regular adding operations.

Under certain conditions it is necessary to disable the coupling pawl disengaging arm 377 to permit the differential plate 370 and the differential actuators 371 to move with the differential arm 350 so that when correcting an error the differential arm 350 and differential plate 371 may be set under control of the complementary amount for this bank as determined by the key 63 which is depressed during such error correcting operation to correct this highest amount or overflow wheel of the totalizers.

This is done under control of the star key 62, and will now be described. Rigidly secured to the shaft 311, to which it will be remembered is also secured the arm 377, is a bell crank 390 (Figs. 8 and 10). A finger 391 of the bell crank 390 is held, by a spring 394, in engagement with a shoulder 392 of an arm 393 secured to the previously described shaft 156. Also secured to the shaft 156 is an arm 395 (Figs. 7, 8 and 10) which carries a pin 396. The arm 393 is held in the position shown in Fig. 10 by a torsion spring 397 (Fig. 8) having one end bearing against the hanger 273, for this combination bank, and the other end bearing against a pin 398 of an arm 399 secured to the shaft 156. This same spring 397 also holds the pin 396 in the normal position (Fig. 7) ready to be acted upon by means under control of the star key 62 as will be later described.

Mounted in the key frame bank 270 is the previously mentioned star key 62. The star key carries the usual pin 400, which is adapted to cooperate with and operate a bar 401, pivoted at its upper end on an arm 402 and at its lower end to a lever 403, both of which are mounted on the key frame 270. A pin 404 on an arm 405 pivoted at 406 in the key frame 270 is normally held against the left side of the arm 403 by a spring 407. This arm 405 has an integral finger 408 which lies above the pin 396 in the arm 395.

From the above description it will be clear that whenever the star key 62 is depressed its pin 400 will move the bar 401 downwardly and rock the arm 403 clockwise, which through the pin 404 will rock the arm 405 and finger 408 counterclockwise whereupon the finger will, through its contact with the pin 396 rock the arm 395 and consequently the shaft 156 in a clockwise direction against the action of the spring 397. This clockwise movement of the shaft 156 rocks the arm 393 clockwise and disengages the shoulder 392 from the finger 391 of the bell crank 390.

However, the spring 394 cannot function immediately upon depression of the star key 62 because in the normal position the bell crank 390 is held in the position shown in Fig. 10, by a stud 421 on an arm 422 pivoted on a rod 423. This arm 422 is rocked, by means later described, to move the pin 421 upwardly, and position it in front of a recess 420 in the bell crank 390, and when this occurs the spring 394 rocks the bell crank 390, shaft 311, and arm 377 counterclockwise, moving the hook 380 out of the path of movement of the pin 376, and consequently when the arm 350 is moved upwardly the coupling pawl 373 will not be disengaged from the pin 375 on the differential arm 350, and since the coupling pawl is carried by the differential plate 370, this plate and the differential actuator 371 will be moved upwardly under the control of the depressed key 63 to add the complement, determined by said key, into the totalizer wheel associated with this combination bank.

It has just been described how the depression of the star key 62 removes the latch arm 393 from its contact with the finger 391 of the bell crank 390 to permit the spring 394 to rock the bell crank 390 and consequently the arm 377 in a counterclockwise direction to cause the coupling pawl 373 to remain coupled to the differential actuator 371.

As above mentioned the spring 394 cannot function until the arm 422 is moved. This arm 422 is connected by a bail 424 to an arm 425 carrying a stud 426 held by a spring 427 against a cam plate 428 secured to the main drive shaft 303.

Shortly after the beginning of the operation of the machine and consequent clockwise movement of the shaft 303 the cam 428 is moved from beneath the stud 426, whereupon the spring 427 rocks the arms 422 and 425 clockwise and moves the stud 421 opposite the recess 420 of the bell crank 390. Consequently after depression of the star key 62 and removal of the latch arm 393, then when the cam 428 is removed from the stud 426, the spring 394 rocks the bell crank 390, shaft 311, and arm 377 counterclockwise, in the manner previously described, to permit the pawl 373 to remain coupled with the pin 375.

Since the shaft 311 is rocked counterclockwise by the spring 394, all four of the zero stops 310, for the four item count differentials, are moved counterclockwise out of the paths of their respective pins 316 (Fig. 7) thus permitting all item count differentials to go to the "9" position during the error correcting operation in order to correct the item count in the counter associated with the totalizer in which the error occurred. "9" being the complement of "1" when said "9" is added to the amount in the item counter it is the same as subtracting "1," thus the item count error is thereby corrected.

Near the end of the error correcting operation the cam 428 rocks the arms 425 and 422 counterclockwise whereupon the pin 421 rocks the bell crank 390, shaft 311, arm 377 and zero stops 310 back to their normal positions shown in Figs. 7 and 10 and when the star key 62 is released the spring 398 rocks the shaft 156 counterclockwise and the latch arm 393 is thus again moved into its latching position with the finger 391.

When reading the crossfooter to determine the amount of an error it is necessary to disable the coupling pawl disengaging arm 377 to permit the differential plate 370 and actuators 371 to move with the differential arm in order to sub totalize the overflow wheel associated with the combination differential.

The means for effecting such control over the coupling pawl disengaging arms will now be described. In Fig. 7 there is shown the usual shaft 431 having secured thereto arms 432 (only one of which is shown), said arms supporting a rod 433. This rod 433 is the usual rod for moving the zero stops of the regular amount banks into in effective positions during total and sub-total operations in the well known manner as illustrated and described in the United States Patent of M. M. Goldberg No. 2,175,346, dated October 10, 1939.

In this patent is described the two separate movements given to the shaft 431 the first of which moves the rod 433 down until it touches the arm 408 and the second movement of the rod 433 rocks the arm 408 which in turn rocks the arm 395 and shaft 156 to move the latch 393 away from the finger 391, after which the spring 394 can function to rock the coupling pawl disabling arm 377 when the cam 428 removes the pin 421 from the face of the finger 391 in the manner above described.

Therefore, the sub-total may be taken from the overflow wheel of the crossfooter by this combination bank differential mechanism.

Figure 9:
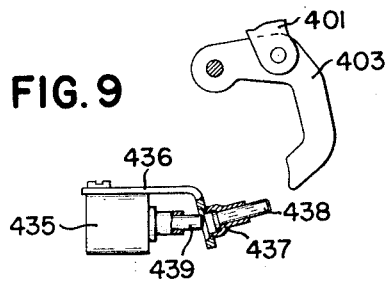
Fig. 9 is a detail of part of the mechanism shown in Fig. 7 in connection with the control of the release of the machine when an error has been made.

The star key 62 also functions to operate a normally open microswitch 435 (Figs. 7, 9 and 11) which is in the machine release circuit. This switch 435 is mounted on a bracket 436 carried by the machine frame. The bracket 435 supports a bushing 437 in which is a freely mounted plunger 438.

It will be remembered that whenever the star key 62 is depressed the arm 403 is rocked in a clockwise direction, and when this occurs the lower end of the arm 403 contacts the plunger 438, moving it toward the left (Fig. 9) a distance sufficient to cause its left end to contact and move a microswitch plunger 439 to the left an amount sufficient to close the switch 435.

Machine release solenoid control

As has been previously described, the machine is adapted to be released upon operation of the solenoid 87, shown in Fig. 13, and diagrammatically in Fig. 11. This solenoid 87 is in a circuit across the lines 440 to 441, to which there is a supply of current of 110 to 115 volts A. C. 60 cycles.

The switch 132 is adapted to be closed upon the depression of any of the keys 67 and 68 of rows 3 and 4, respectively, and also upon the depression of any of the three upper keys 66 of row 2, or the depression of any of the four lower keys of row 2. Upon depression of any of the above mentioned keys a circuit is completed from line 441 through the normally closed switch 227, through the switch 132 closed by the depression of any of the above mentioned keys, to line 443, through the solenoid 87 which energizes this solenoid 87 to cause the machine to release.

Whenever there has been an error made the operator depresses the Error key to determine the amount of the error and during such operation the error key 65 of row 1 closes the switch 208 which completes a circuit as follows: from line 441 through switch 208, line 443, through the solenoid 87, thus causing the machine to be released upon depression of the Error key 65 of row 1. Also during this operation the switch 227 is caused to open by the clockwise movement of the bell crank 225 (Fig. 12) in the manner previously described, and therefore, since this switch 227 is held open, the closing of the switch 132 in an immediate subsequent operation does not complete the circuit and the machine cannot be released upon the depression of any of the keys of rows 3 and 4, or any of the upper three keys or lower four keys of row 2.

It will be remembered that after the depression of the Error key, which is for the purpose of taking a sub-total of the crossfooter to find out the amount of the error, the operator then depresses the star key 62 in combination with the particular key 66, 67 or 68, wherein the error occurred. When this occurs the depression of the star key 62 closes the switch 435, which followed by the depression of one of the keys 66, 67 or 68, closes the switch 132, whereupon the circuit will be established from line 441 through switch 435, through line 444, switch 132, line 443, to the solenoid 87, whereupon the machine may be released upon depression of the star key 62, followed by depression of the proper key 66, 67 or 68.

At times it may be desirable to release the machine following a lock-up by an error, by the depression of the lock release key 66, followed by depression of one of the keys 67 or 68, and when this occurs, depression of the lock release key closes the switch 162, whereupon a circuit is established from line 441 through switch 162, line 444, switch 132, line 443, to the solenoid 87, whereupon the machine may be released by depression of the lock release key followed by depression of one of the keys 67 or 68.

As above mentioned, the switch 227, which is controlled by the differential positioning of the total control plate 211, is closed at all times except when the differential is in the error position. However, when an error has been made, as above mentioned, the switch 227 is open, and one of the keys 67 or 68, to which the error was charged, is now depressed, closing the switch 132, but the machine does not operate because the circuit is still broken at the switch 227. However, the sorting box compartment indicator is operated in the manner to be hereinafter described and the check in error is removed from the bin with the open indicator, and the other checks replaced. Then upon depression of the star key 62 which is the last key pressed when setting up the complement of the amount which caused the error, to correct the total, the switch 435 is closed to complete the circuit as above described through the switch 435 and switch 132, which is closed, even though the switch 227 is open.

A suitable cabinet or casing (not shown) covers the mechanisms described to protect them from dirt and unauthorized manipulation. Suitable doors under lock and key are arranged in convenient locations for proper inspection of the mechanisms.

Sorting compartments

As has been previously stated, the present invention includes a sorting device comprised of a housing or cabinet containing one or more rows of filing compartments located in stepped arrangement. This sorting device is similar to that illustrated and described in the above mentioned Spurlino and Rauch Patent No. 2,416,598, and will be but briefly described insofar as the sorting device is concerned. In the present case, more particular attention is directed to the control of the operation of the indicating means or signal wherein the indicating means or signal is retained in an operated position a longer time than in previous machines, such as disclosed in the above mentioned Spurlino and Rauch patent, to give the operator more time in which to deposit the checks in the sorting bins or compartments associated with the particular indicator which has been operated to indicate that that is the particular compartment into which the checks should be deposited, this of course, being when checks are recorded in the machine and sorted in connection with bank proof operations.

This sorting device will now be described, it being illustrated in Figs. 14 to 17 inclusive. These compartments are formed by side walls 450 and 451 with slanting partitions 452 and bottoms 453. The partitions 452 have slots 454 formed therein whereby the operator may at any time remove assorted records or checks from the compartments. The compartments are arranged in step-like fashion, which facilitates the convenient filing of the record material therein.

Each compartment is provided with a signaling member or indicator 455 (Figs. 14 to 17) to act as a signal to the operator to designate into which compartment said operator should file or place the check.

This indication is accomplished by the upper side of the indicator 455 being finished in the same color as the compartment, while the underside of the indicator is finished in a contrasting color to act as a signal to the operator. Upon operation of the indicator, the contrasting color of the underside thereof will be exposed to view, thereby indicating to the operator which compartment should receive the recorded material.

The present indicators 455 are somewhat larger than those of the above mentioned Spurlino and Rauch patent in that in the present case these indicators 455 cover substantially the entire top of the compartment, thus preventing the operator from getting the check in the wrong compartment by accident because there is not sufficient room between the edges of the indicator 455 and the back of the partition 452 to get a check in unless the operator deliberately tries to do so, which of course is not the normal or proper operation.

The indicator 455 is secured to a shaft 461, loosely mounted on a bracket 462 secured to the partition 452. Freely mounted on the shaft 461 is a bell crank 463, one arm of which is operatively connected to the indicator 455 by means of a torsion spring 464. The spring 464 is mounted around the shaft 461 and straddles one arm of the bell crank 463 and also has both of its ends hooked onto the indicator 455, as is clearly shown in Figure 17. The purpose of this flexible connection between the bell crank 463 and the indicator 455 is threefold; namely, silencing the noise; avoiding vibration and rebound, and providing quicker and smoother action. With such an arrangement the solenoid does not have to overcome the inertia of the indicator instantly at the beginning of the movement.

Through such flexible connections the bell crank 463 and the indicator 455 are adapted to move as a single unit. The arm of the bell crank 463 which coacts with the indicator 455 carries a rubber bumper 465, which extends beyond the upper and lower sides of such arm as is shown in Figs. 14 and 15. The lower portion of the rubber bumper 465 is normally held in contact with the indicator by the torsion spring 464, while the upper portion of the bumper is adapted to strike the bracket 462 when the bell crank 463 is rocked clockwise to move the indicator 455 into effective or indicating position. The other arm of the bell crank 463 is connected by a link 466 to an armature 467 of a solenoid 468, mounted on the partition 452. The partition 452 is slotted to accommodate the arm of the bell crank 463 and a portion of the link 466 so there will be no interference between the parts and the record material deposited in the receiving compartment. For the same reason the lower portion of the link 466 and the solenoid 468 are located below the bottom 453 of the compartment, as illustrated in Fig. 16. A tension spring 469, fastened at one end to a stud 470 in the bracket 462 and at its other end to a stud 471, carried by the link 466, normally serves to hold the link 466 and the bell crank 463 in the position shown in Figs. 14 and 16, thereby maintaining the indicator 455 in its ineffective or nonindicating position, as shown.

Upon energization of the solenoid 468 the armature 467 is forced downwardly and through the link 466 rocks the bell crank 463 clockwise until the latter is stopped by the rubber bumper 465 striking the bracket 462. The bell crank 463 will at this time, through the flexible connection formed by the present spring 464, between the bell crank 463 and the indicator 455, rock the indicator 455 clockwise about the shaft 461 until it reaches a signaling or indicating position, whereupon its contrastingly colored under-surface is exposed to the view of the operator, thus attracting the operator's attention to its respective compartment, for the purpose of having record material deposited therein by the operator.

In former machines, and particularly that shown and described in the above mentioned Spurlino and Rauch patent, the indicator remains in its effective or indicating position only until the control key was returned to its normal undepressed position which de-energizes the solenoid which occurs near the end of operation of the accounting machine.

However, in the present case the de-energization of the solenoid is delayed for a definite period in order to give the operator more time to file the record material in the compartment. This so-called delayed action and the de-energization of the solenoid will be hereinafter described.

However, when the solenoid is de-energized the spring 469 moves the link 466 upwardly and rocks the bell crank 463 counterclockwise, which movement of the bell crank will likewise be transmitted to the indicator 455 to return the latter to its normal non-signaling or non-indicating position.

The magnets 468 are energized upon depression of the keys 67 and 68 in rows 3 and 4, respectively, there being one compartment associated with each of those keys, and also the keys 66 of row 2, numbered 19 and 20.

*Wiring diagram and electrical controls for the delayed action of the compartment indicators or signal devices*

Before describing the circuits for causing operation of the compartment indicators and the delayed action circuit which causes the indicator to remain in its indicating position after the completion of the machine operation, there are two switches and means for operating them, which are in the circuit and will now be described. These switches are shown in Figs. 7, 12 and 19. Fig. 7 shows the switch and the means for operating the switch, which is in the holding circuit to prevent release of the indicator operating magnet 468. The other switch, which is shown in Figs. 7 and 19 is a switch operated by the indicator liner line to close the circuit through a condenser which makes contact through a magnet, to cause that magnet to operate a switch in the holding circuit for the indicator operating magnet 468.

The above mentioned holding switch 475 is shown in Fig. 12, and is mounted on a bracket 476, supported by the machine side frame. This switch 475 is normally open.

Pivoted on a stud 477 on the machine side frame is an arm 478 having an insulating roller 479, normally contacting the switch 475. The arm 478 has a finger 480, normally held, by a spring 483, against a low surface 481 of a cam 482 fast on the main operating shaft 303 of the machine.

As the cam 482 rotates clockwise a rise 484 on the cam rocks the arm 478 counterclockwise a distance sufficient to cause the insulating roller 479 to close the contacts of the switch 475. At the end of the operation of the shaft 303, a spring 483 rocks the arm 478 clockwise to its normal position to cause the finger 480 to again assume its position on the low surface 481 of the cam, whereupon the switch 475 will open.

The switch which is operated by the indicator aliner line is shown in Figs. 7 and 19, and includes three switch plates 488, 489 and 490, mounted on a bracket 491 supported by the machine frame.

As shown in Fig. 19, the circuit is closed between the blades 488 and 489 and open between blades 489 and 490.

The blade 489 is provided with a hook 492 and engages an arm 493 made of insulating material, which in turn is carried by an arm 494 secured to the indicator liner shaft 334.

When the indicator aligner 332 is disengaged from the segment 330, which occurs at approximately between 17 and 42 degree time of movement of the shaft 303, the shaft 334 and consequently the arm 494, and insulating arm 493, are rocked clockwise, thus breaking the circuit between the blades 488 and 489, and closing the circuit between the blades 489 and 490.

In the wiring diagram in Fig. 18 the blade 488 is represented by the small circle marked 488, the blade 489 by the line marked 489, and the blade 490 by the small circle marked 490.

The circuit for controlling delayed closing of the compartment indicator will now be described. Referring to Fig. 18, current is derived from supply lines 501 and 502. This current is 110 volts A. C. and goes to a transformer 503. In the circuit is a rectifier 504, which changes the alternating current to direct current. From the rectifier the circuit runs through line 505, line 506, and line 507, to the ground 508. In this circuit there is provided a condenser 509 to reduce the transformer humming.

Upon the depression of, for example, one of the keys 67, the contacts 147 and 148 are closed, whereupon a circuit is completed from the rectifier 504 through line 510, switch 511, line 512, contacts 147 and 148, line 513, through magnet 468 to line 514 and thence to line 507 and the ground 508. This circuit energizes the magnet 468 which, as previously described, raises the indicator 455 on the compartment which corresponds to the operated key 67. The energization of magnet 468 closes switch 516 which is held closed after the key 67 is released. In this circuit there is an adjustable rheostat 515 to control the speed of the opening of the shutter to in turn control and reduce the noise accompanied by the opening of the indicator 455.

When the indicator aligner 332 is disengaged from the segment 330 the switch plate 489 is operated and moves to the dot-and-dash line position shown in Fig. 18, thus completing a circuit from the line 505 through line 520, line 521, resistor 522, condenser 523, through switch plates 489 and 490 to line 514, and thence to line 507 and to the ground 508. This last circuit just described charges the condenser 523. During the time this condenser 523 is being charged the cam 482 (Fig. 12), through the lever 478, closes the switch 475 which completes the holding circuit for the magnet 468 as follows: from the line 510 through switch 475, line 525, the switch 516 which was closed by energization of the magnet 468, thence through the magnet 468, line 514 and line 507 to the ground 508. This holding circuit insures that the relay 468 will remain energized until after the switch 511 is moved from the position shown in Fig. 18 into contact with a switch plate 526 designated by a circle.

When the indicator aligner is moved back into engagement with the segment 330 the switch plate 489 is moved from the dot-and-dash line position back to the position shown in Fig. 18, whereupon the condenser leaks current back through line 530, through magnet 531, to energize this magnet. The energization of which operates the switch 511, above mentioned to cause it to move from the position shown in Fig. 18 into contact with the switch plate 526. When this occurs the holding circuit for the magnet 468 is as follows: from line 510, through switch 511, the plate 526, line 525, switch 516, through the magnet 468, lines 514 and 507, to the ground 508. This magnet 531 thus holds the switch 511 in position to complete the last mentioned holding circuit for the magnet 468 until all the current has leaked out from the condenser 523 thus causing the magnet 468 to remain energized after the completion of the operation of the machine. In circuit with the condenser 523 is an adjustable rheostat 532 which may be manually set to control the speed of the leakage of the condenser 523. In this same circuit is a switch 533 which is retained in the position shown in circuit with the rheostat 532 and condenser 523 when it is desired to cause the magnet 468 to delay the closing of the indicator 455.

The magnet 531 retains the switch 511 in its operated position a length of time sufficient to cause the indicator 455 to remain in the open position between 15 and 30 seconds after the completion of operation of the machine.

Should it be desired to have instantaneous closing of the indicator 455, the switch 533 is moved from the full-line position to the dot-and-dash line position, as shown in Fig. 18, thus breaking the circuit so that the switch 511 will not be operated because of the fact that there will be no energization of the magnet 531.

Since all of the various mechanisms and their several functions have been fully described in detail throughout the specifications, it is not thought necessary to give any detailed operation of the machine as a whole at this time.

While the form of mechanism herein shown and described is admirably adapted to fulfill the objects primarily stated, it is to be understood that it is not intended to confine the invention to the one form or embodiment herein disclosed, for it is susceptible of embodiment in various forms.

What is claimed is:

1. In a machine of the class described, the combination of a plurality of differentially adjustable means; coupling means carried by one of said differentially adjustable means to couple the latter to another of said differentially adjustable means for movement in unison therewith; a device normally in position to prevent differential adjustment of still another differentially adjustable means; another device normally in position to cause the coupling means to uncouple said another of said differentially adjustable means from said one of said differentially adjustable means upon initial movement of the latter; means common to both of said devices to retain them in their normal positions; and means to actuate said common means to release both of said devices, to prevent the coupling means from uncoupling said another of said differentially adjustable means from said one of said differentially adjustable means, and to permit differential movement of said still another of said differentially adjustable means.

2. In a machine of the class described, the combination of a plurality of differentially adjustable means; coupling means carried by one of said differentially adjustable means to couple the latter to another of said differentially adjustable means for movement in unison therewith; a device normally in position to prevent differential adjustment of still another differentially adjustable means; another device normally in position to cause the coupling means to couple said another of said differentially adjustable means from said one of said differentially adjustable means upon initial movement of the latter; means common to both of said devices to retain them in their normal positions; means to actuate said common means to release both of said devices, to prevent the coupling means from uncoupling said another of said differentially adjustable means from said one of said differentially adjustable means, and to permit differential movement of said still another of said differentially adjustable means; another means common to both of said devices to prevent operation thereof after their release from said first mentioned common means; and means to operate said second common means to permit operation of said devices.

3. In a machine of the class described, the combination of a plurality of differentially adjustable means; coupling means carried by one of said differentially adjustable means to couple the latter to another of said differentially adjustable means for movement in unison therewith; a device normally in position to prevent differential adjustment of still another of said differentially adjustable means; another device normally in position to cause the coupling means to uncouple said another of said differentially adjustable means from said one of said differentially adjustable means upon initial movement of the latter; means rigidly connected to both of said devices to move them out of their normal positions to prevent the coupling means from uncoupling said another of said differentially adjustable means from said one of said differentially adjustable means, and to permit differential movement of said still another of said differentially adjustable means; a plurality of means cooperating with said rigidly connected means to retain the latter against movement; means for releasing one of said plurality of retaining means; and means for releasing another of said plurality of retaining means.

4. In a machine of the class described, the combination of a plurality of differentially adjustable members; coupling means carried by one of said differentially adjustable means to couple the latter to another of said differentially adjustable means for movement in unison therewith; a device normally in position to prevent differential adjustment of still another of said differentially adjustable means; another device normally in position to cause the coupling means to uncouple said another of said differentially adjustable means from said one of said differentially adjustable means upon initial movement of the latter; a common support for both of said devices and to which said devices are secured; a member also secured to said common support and adapted to move both of said devices out of their normal positions, to prevent the coupling means from uncoupling said another of said differentially adjustable means from said one of said differentially adjustable means, and to permit differential movement of said still another of said differentially adjustable means; means to latch said member against movement; manipulative means; means operated by said manipulative means to release the latch from said member; means to retain said member in normal position to prevent operation of the member when released from said latch means; and means to automatically operate said retaining means to free said member for movement.

5. In a machine of the class described according to claim 4 characterized by the fact that retaining means is comprised of a plurality of arms connected by a bail, one arm of which has a projection normally engaging said member and another arm of which has a projection cooperating with said automatically operated means.

6. In a machine of the class described according to claim 4, wherein said retaining means comprises a spring-actuated rockable device having a projection thereon cooperating with said member.

7. In a machine of the class described involving a plurality of cycles of operation necessary to the accomplishment of a complete accounting transaction, the combination of a machine releasing mechanism; tripping means normally holding said releasing means in an ineffective position; electrical means connected to said tripping means and adapted to operate the same to free said releasing mechanism when a circuit is closed through said electrical means; a bank of depressible keys; a device operated by any key in said bank to close a normally open switch to close said circuit, through said switch and through a normally closed switch; an add and subtract totalizer; means to actuate said add and subtract totalizer additively and/or subtractively; means under control of said add and subtract totalizer for holding said releasing mechanism in an ineffective position when said add and subtract totalizer is not at zero at the end of a cycle of operation; a second bank of keys, one of which (Error) is operated to cause a sub-total to be taken from the add and subtract totalizer to determine the amount of error in said totalizer; means operated during such operation of the machine to cause the above mentioned closed switch in said circuit to be opened to prevent operation of said electrical means by one of the first mentioned keys when a key in the last mentioned bank is depressed to cause said sub-total operation; and a third manipulative device and means operated thereby for closing a switch to complete a circuit through said switch and through the first mentioned switch which is closed by depression of one of the first mentioned keys, along with depression of a key in the second mentioned bank, at which time the first mentioned switch did not complete the circuit due to the fact that the second mentioned switch was opened during the error determining or sub-total operation.

8. In a machine of the class described, including an add and subtract totalizer, means to add and subtract thereon, and means to take totals and sub-totals therefrom, and involving a plurality of cycles of operation of the machine in order to accomplish a complete accounting transaction, the combination of a machine releasing mechanism; tripping means normally holding said releasing mechanism in an ineffective position; electrical means connected to said tripping means and adapted to operate the same to free said releasing means when a circuit is closed through said electrical means; a normally open switch and a normally closed switch in said circuit; a bank of depressible keys; a device operated by depression of one of the keys to close said normally open switch; a second bank of keys; a second normally open switch; means controlled by a key in the second mentioned bank to close said second mentioned open switch; means operated during the operation caused by depression of the last mentioned key to cause said normally closed switch to open and remain open at the end of this particular cycle of operation, thus preventing an immediate subsequent operation of the machine by depression of one of the first mentioned keys, which closes the first mentioned normally open switch; a single manipulative member adapted to be operated during said immediate subsequent operation of the machine; and means operated by the operation of said single manipulative member for closing another normally open switch to complete the circuit through said electrical means; through the last mentioned switch, and through the first mentioned normally open switch, which is closed during this immediate subsequent operation of the machine.

9. In a machine of the class described, the combination of a main operated member; a driving means; a plurality of driven members driven by said driving means; a projection on one of said driven members; a coupling device carried by another of said driven members and normally engaging said projection; means normally retained in position to be engaged by said coupling device upon initial movement of said driven members to cause said coupling device to be disengaged from said projection; a latch to retain said last mentioned means in said position; a depressible key to release the latch upon depression of the key; a rockable device cooperating with said last mentioned means to retain the latter in normal position after release thereof by said latch; a member actuated by said main operating member to retain said rockable device in its normal position, and adapted to release said rockable device upon operation of the main operating member; and means to actuate said rockable device upon its release, to move the rockable device out of its retaining position.

10. In a machine of the class described, according to claim 9 wherein said rockable device comprises a plurality of arms connected by a bail, said arms carrying projections to retain said latch and to cooperate with the actuating means for the rockable device.

11. In a machine of the class described, the combination of a main operated member; a driving means; a plurality of driven members driven by said driving means; a projection on one of said driven members; a coupling device carried by another of said driven members and normally engaging said projection; means normally retained in position to be engaged by said coupling device upon initial movement of said driven members to cause said coupling device to be disengaged from said projection; a latch to retain said last mentioned means in said position; a depressible key to release the latch upon depression of the key; a device controlled by the main operating member and cooperating with said last mentioned means to retain the latter in normal position after release thereof by said latch, and adapted to be released by said main operating member upon actuation thereof; and means to move the last mentioned device upon its release, to in turn release the means which normally causes the coupling device to be disengaged from said projection.

12. In a machine of the class described, the combination of a main operated member; a driving means; a plurality of driven members driven by said driving means; a projection on one of said driven members; a coupling device carried by another of said driven members and normally engaging said projection; means normally retained in position to be engaged by said coupling device upon initial movement of said driven members to cause said coupling device to be disengaged from said projection; and a spring actuated latch engaging the last-mentioned means to retain said last mentioned means in said position.

13. In a machine of the class described, the combination of a main operated member; a driving means; a plurality of driven members driven by said driving means; a projection on one of said driven members; a coupling device carried by another of said driven members and normally engaging said projection; means normally retained in position to be engaged by said coupling device upon initial movement of said driven members to cause said coupling device to be disengaged from said projection; a plurality of retaining devices cooperating with the last mentioned means and normally in effective positions; a depressible key to release one of said retaining devices upon depression of said key; and means controlled by said main operating member to release another of said retaining devices.

14. In a machine of the class described, the combination of a main operated member; a driving means; a plurality of driven members driven by said driving means; a projection on one of said driven members; a coupling device carried by another of said driven members and normally engaging said projection; means normally retained in position to be engaged by said coupling device upon movement of said driven members to cause said coupling device to be disengaged from said projection; a plurality of retaining devices cooperating with said normally retained means and normally in effective positions; a depressible key to release one of said retaining devices upon depression of said key; means controlled by said main operating member to release another of said retaining devices; and means to operate said normally retained means to move it into a position to prevent said coupling device from being disengaged from said projection upon release of said plurality of said retaining means.

15. In a machine of the class described, the combination of differentially adjustable means; a second differentially adjustable means; a third differentially adjustable means; a coupling device carried by the second differential means normally coupling it to the third differential means for movement in unison therewith; a member normally in a position to prevent the differential movement of the first differential means; a second member normally in a position to cause the coupling device to be disengaged from said third differential means upon movement of said second and third differential means, to prevent differential movement of said third differential means; a latch device to hold said first and second members in their normal positions; a depressible key to operate said latch to release said first and second members; and means to move the first and second members out of effective positions upon release of said latch to permit the first differential means to be set in different positions, and to cause said second and third differential means to remain coupled together by said coupling device for differential movement in unison.

16. In a machine of the class described, according to claim 15 wherein said means to move the first and second members comprises a spring actuated device rigidly connected to the first and second members.

17. In a machine of the class described, the combination of a main operating means; differentially adjustable means; a second differentially adjustable means; a third differentially adjustable means a coupling device carried by the second differential means normally coupling it to the third differential means for movement in unison therewith; a member normally in a position to prevent the differential movement of the first differential means; a second member normally in a position to cause the coupling pawl to be disengaged from said third differential means upon initial movement of said second and third differential means to prevent differential movement of said third differential means; a common supporting member for said first and second members and to which they are both secured; a spring operated means secured to said supporting member and tending to move said first and second members into ineffective positions; a plurality of retaining means cooperating with said spring operated means to normally prevent its operation; a depressible key for releasing one of said retaining means from said spring operated member; and means controlled by the main operating means for releasing another of said retaining means from said spring operated member.

PASCAL SPURLINO.
ALFRED G. KIBLER.
RUDOLPH J. MOSER.
EUGENE H. WOLF.

References Cited in the file of this patent
UNITED STATES PATENTS

| Number | Name | Date |
|---|---|---|
| 1,857,299 | Fried et al. | May 10, 1932 |
| 2,228,165 | Haegele et al. | Jan. 7, 1941 |
| 2,229,771 | Spurlino et al. | Jan. 28, 1941 |
| 2,416,598 | Spurlino et al. | Feb. 25, 1947 |